US010397652B2

(12) United States Patent
Patel et al.

(10) Patent No.: US 10,397,652 B2
(45) Date of Patent: Aug. 27, 2019

(54) RECOMMENDING A LOCATION BASED ON QUALITY OF SERVICE AT A LOCATION

(71) Applicant: Rovi Guides, Inc., San Carlos, CA (US)

(72) Inventors: Milan Patel, Santa Clara, CA (US); Imran Khaliq, Menlo Park, CA (US)

(73) Assignee: Rovi Guides, Inc., San Jose, CA (US)

( * ) Notice: Subject to any disclaimer, the term of this patent is extended or adjusted under 35 U.S.C. 154(b) by 30 days.

(21) Appl. No.: 15/158,090

(22) Filed: May 18, 2016

(65) Prior Publication Data
US 2017/0339457 A1 Nov. 23, 2017

(51) Int. Cl.
| H04L 12/26 | (2006.01) |
| H04L 29/06 | (2006.01) |
| H04L 29/08 | (2006.01) |
| H04N 21/45 | (2011.01) |
| H04N 21/436 | (2011.01) |
| H04N 21/442 | (2011.01) |
| H04N 21/466 | (2011.01) |
| H04N 21/482 | (2011.01) |
| H04N 21/647 | (2011.01) |

(52) U.S. Cl.
CPC ......... *H04N 21/4524* (2013.01); *H04L 43/08* (2013.01); *H04L 65/1083* (2013.01); *H04L 67/04* (2013.01); *H04L 67/18* (2013.01); *H04L 67/22* (2013.01); *H04L 67/322* (2013.01); *H04N 21/43615* (2013.01); *H04N 21/44222* (2013.01); *H04N 21/4667* (2013.01); *H04N 21/4668* (2013.01); *H04N 21/4821* (2013.01); *H04N 21/4826* (2013.01); *H04N 21/64738* (2013.01)

(58) Field of Classification Search
CPC ............. H04N 21/812; H04N 21/4532; H04N 7/17318; H04N 21/44222; H04N 21/25891

See application file for complete search history.

(56) References Cited

U.S. PATENT DOCUMENTS

| 8,026,805 | B1 | 9/2011 | Rowe |
| 8,122,477 | B1 | 2/2012 | Stepanian |
| 8,156,528 | B2 | 4/2012 | Baumgartner et al. |
| 8,818,413 | B2 | 8/2014 | Creemer |
| 8,880,648 | B1* | 11/2014 | Arora ................. H04N 21/4126 709/218 |
| 8,965,170 | B1 | 2/2015 | Benea et al. |
| 9,444,897 | B1 | 9/2016 | Bostick et al. |
| 2003/0126606 | A1 | 7/2003 | Buczak et al. |
| 2004/0107284 | A1* | 6/2004 | Koperda ............... H04J 3/1694 709/229 |
| 2008/0060043 | A1 | 3/2008 | Malik |
| 2011/0138064 | A1* | 6/2011 | Rieger .............. G06F 17/30905 709/228 |
| 2011/0167440 | A1 | 7/2011 | Greenfield |
| 2011/0307930 | A1 | 12/2011 | Rouse |
| 2013/0035115 | A1* | 2/2013 | Lindegren ............ H04W 24/02 455/456.3 |
| 2014/0344848 | A1 | 11/2014 | Busse |
| 2015/0135238 | A1 | 5/2015 | Wickenkamp |
| 2015/0281767 | A1 | 10/2015 | Adimatyam et al. |

(Continued)

Primary Examiner — Benjamin R Bruckart
Assistant Examiner — Anthony Batamoi
(74) Attorney, Agent, or Firm — Haley Guiliano LLP

(57) ABSTRACT

Systems and methods are described herein for a media guidance application that recommends a location to consume media content based on the quality of service at various locations.

19 Claims, 12 Drawing Sheets

(56) References Cited

U.S. PATENT DOCUMENTS

| | | |
|---|---|---|
| 2015/0326447 A1 | 11/2015 | Yoon et al. |
| 2015/0350590 A1* | 12/2015 | Micewicz ........ H04N 21/42201 386/230 |
| 2016/0073162 A1 | 3/2016 | Cooperstein et al. |
| 2016/0092034 A1 | 3/2016 | Pillai et al. |
| 2016/0094880 A1 | 3/2016 | Ward et al. |
| 2016/0094883 A1 | 6/2016 | Larson et al. |
| 2016/0157057 A1* | 6/2016 | Kim ..................... H04W 4/023 455/456.3 |
| 2016/0192005 A1 | 6/2016 | Larson et al. |

* cited by examiner

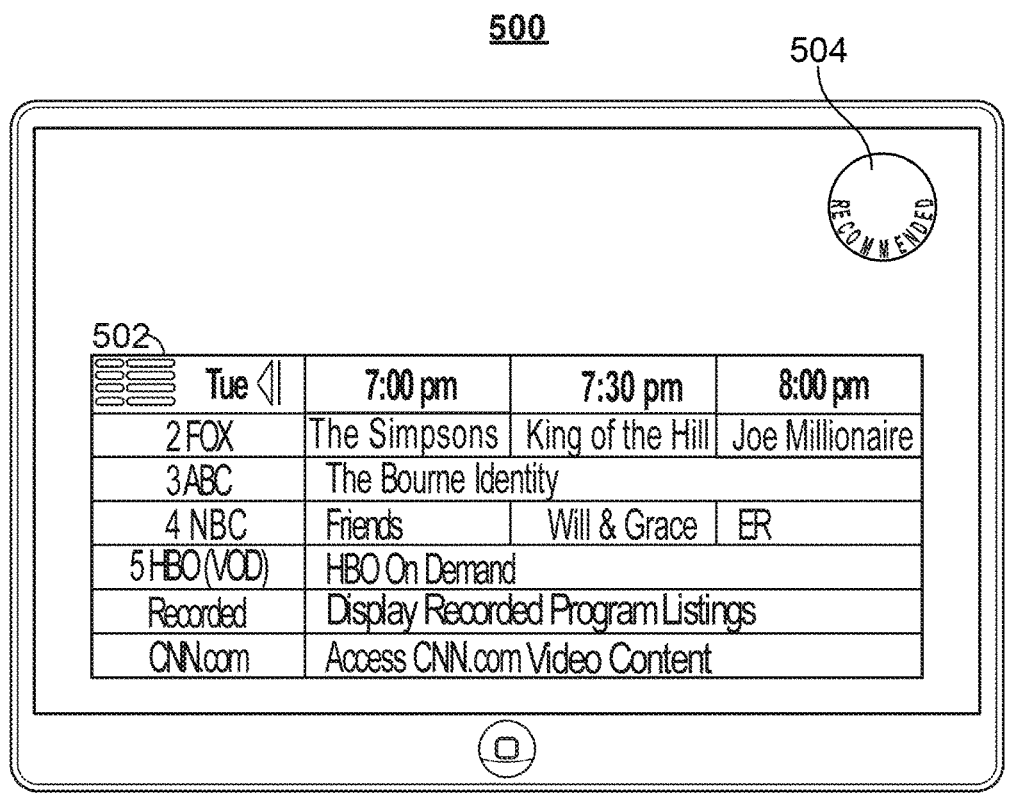
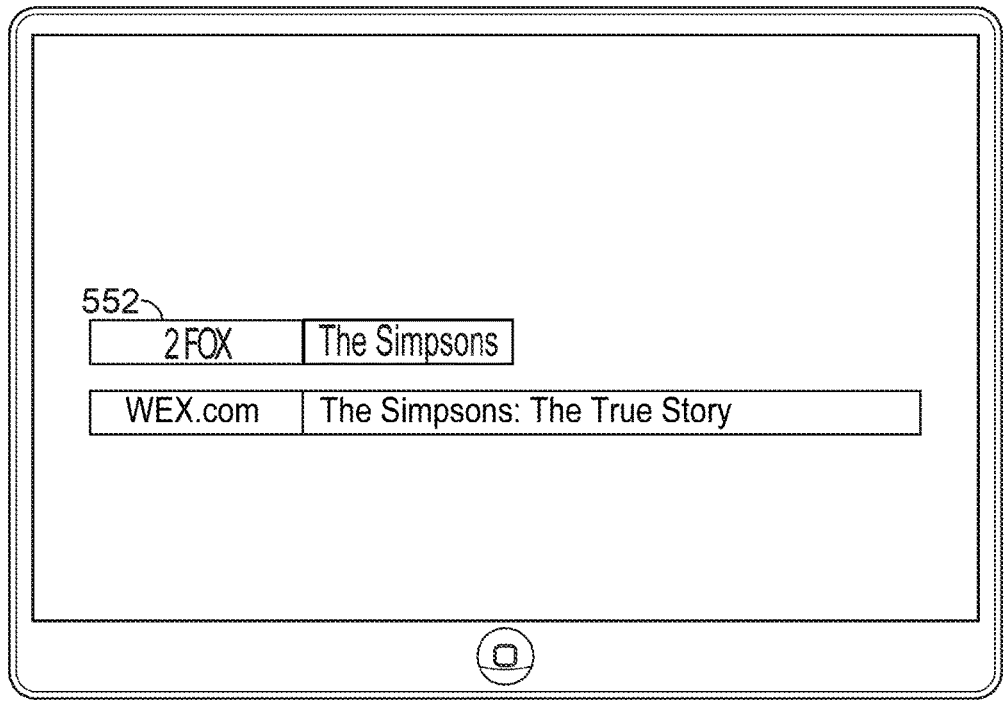
FIG. 5

1100

```
1100 ...
1101 Initialization Subroutine
1102 ...
1103 //Routine to Select Media Asset based on Quality of Service:
1104
1105 Receive Media Assets Available at Location
1106 For each Media Asset Available at Location:
1107    A = Accessed value of the Required Quality of Service
1108    B = Accessed value of Quality of Service at Location
1109       If (Abs(B-A)<=tolerance)
1110          Execute Subroutine to Include Media Asset in Filtered List
1111       Else If (B<A)
1112          Execute Subroutine to Exclude Media Asset in Filtered List
1113 ...
1114 Termination Subroutine
1115 ...
```

FIG. 11

RECOMMENDING A LOCATION BASED ON QUALITY OF SERVICE AT A LOCATION

BACKGROUND

In conventional systems, users have access to a plethora of media content. Moreover, given the rise in mobile devices, over-the-top ("OTT") content, and the general accessibility of media content in numerous locations, users are able to access that media content in places which they previously could not. Nonetheless, while media content is widely available, specific media content may not be available at all locations at all times. For example, different content delivery networks may carry or provide different media content. Moreover, even if a content delivery network does provide particular media content at a location, a user may not be able to access that media content due to subscription status, quality of service issues, etc.

SUMMARY

Accordingly, systems and methods are described herein for a media guidance application that recommends media content and/or location to access media content to a user based on the media content likely to be available to a user in at a given location, on a given device, and/or the quality of service at a particular location. The media guidance application may also automatically determine the given location or given based on a current trajectory of the user, and recommend a media asset from the media content available at that location or on that device. Moreover, in order to recommend content having the greatest interest to a user at a particular time, the media guidance application bases the recommendations it is providing on content recently consumed by the user on a first device. Specifically, the media guidance application may monitor content that the user recently consumed on a first device (e.g., a set-top box connected to a television) and may then recommend other content for consumption to the user on a second device (e.g., smart phone) based on the content that the user recently consumed on the first device.

For example, just prior to a user leaving her home, the user may be watching a news story about an approaching winter storm on a television. When the user leaves her home, the media guidance application may determine that the user is likely going to her car. Therefore, the media guidance application may search content available in the user's car or on the user's smart phone (which may be accessed from the car) for programs that include information about the approaching winter storm. For example, if the media guidance application determines that the user does not have access to the same news program in her car that the user consumed in her house, the media guidance application may recommend similar content (e.g., a radio station news broadcast reporting on the winter storm). Additionally or alternatively, if the media guidance application determines that while the user does have access to the same news program in her car (e.g., she could watch the program on her smartphone) that the smartphone is unlikely to be able to receive the program due to quality of service issues, the media guidance application may recommend corresponding audio or textual data that will be less affected by the quality of service issues.

In another example, just prior to a user leaving her home, the user may be watching a football game. When the user leaves her home, the media guidance application may determine that the user is driving her car towards an area with low quality of service. Therefore, the media guidance application may search content available in the user's car or on the user's smart phone (which may be accessed from the car) for programs that include do not require a high quality of service to access (e.g., audio only media assets, low-quality video, etc.) as opposed to program that require a high quality of service (e.g., high-definition, streaming video).

In another example, just prior to a user leaving her home, the user may be watching a basketball game. After the user leaves her home, the media guidance application may determine that the user has arrived at a restaurant that has a subscription to a particular content provider. Therefore, the media guidance application may search content available via the subscription to the content provider for programs that match or otherwise correspond to the basketball game.

In another example, just prior to a user leaving her home, the user may be watching a television program. After the user leaves her home, the media guidance application may determine that the user has arrived at a friend's house that has a subscription to a particular content provider. After determining that the television program is available at the friend's house, the media guidance application may provide instructions for accessing the television program at the friends house (e.g., the channel the television program is broadcast on, instructions for navigating to the content, etc.).

In yet another example, the media guidance application may perform one or more of the function described above simultaneously. For example, just prior to a user leaving her home, the user may be watching a musical. When the user leaves her home, the media guidance application may determine where the user is going, when the user will arrive, what the quality of service is at various locations, etc. The media guidance application may determine where the user may consume the musical (or similar program) and recommend a location. The location may be based on the quality of service at that location, the content available at the location, etc. Moreover, once at a location, the media guidance application may recommend devices and/or provide media guidance data (e.g., a channel) for accessing the musical.

In some aspects, the media guidance application implemented on control circuitry may determine that a user has stopped consuming a first media asset on a first device. For example, the media guidance application may determine that the user has stopped consuming the first media asset on the first device by detecting that the user has moved from a first location corresponding to first device to the second location. Additionally or alternatively, the media guidance application may determine that the user has stopped consuming the first media asset on the first device by detecting that the user has stopped interacting with the first device.

The media guidance application may determine a trajectory of the user in response to determining that the user has stopped consuming the first media asset on the first device. For example, the media guidance application may determine the trajectory by determining a first location corresponding to the first device, determining a current location of the user, and comparing the first location to the current location. For example, by determining the difference between the current location of the user and the initial location of the user, the media guidance application may determine a direction of the user.

The media guidance application may identify a second device corresponding to the trajectory. For example, the media guidance application may store a list of devices corresponding to the user and the various locations of those devices. Furthermore, the media guidance application may identify what locations, if any, correspond to a current trajectory from the first device. For example, the media guidance application may store a second location corresponding to the second device in memory. The media guidance application may then retrieve the second location of the second device from the memory. The media guidance application may then determine that the second location corresponds to the trajectory.

The media guidance application may determine a plurality of media assets available to the user on the second device. For example, while in some cases, the media assets available on the second device may be the same as the media assets available to the user on the first device, in some cases the media assets may differ. Accordingly, before the media guidance application recommends a media asset for presentation on the second device, the media guidance application may first need to determine what media assets are available.

The media guidance application may determine a characteristic of the first media asset. For example, the media guidance application may attempt to recommend a media asset for presentation on the second device that is the same or similar to a media asset recently consumed by the user on a first device. For example, the media guidance application may search for a second media asset that shares the same genre, subject matter, title, type, actor, character, and/or location. For example, the media guidance application may identify characteristics corresponding to the plurality of media assets available to the user on the second device and filter the plurality of media assets available to the user on the second device based on a presence of the characteristic.

The media guidance application may recommend a second media asset from the plurality of media assets available to the user on the second device based on the characteristic. For example, upon finding a second media asset that is similar to the first media asset, the media guidance application may generate an alert that indicates to the user that the second media asset is available on the second device. For example, the media guidance application may determine a plurality of content types consumed by the user during a period of time on the first device and determine the characteristic based on a content type of the plurality of content types most frequently consumed by the user.

In some aspects, the media guidance application implemented on control circuitry may determine that a user has stopped consuming a first media asset at a first location. For example, the media guidance application may determine that the user has stopped consuming the first media asset at the first location by detecting that the user has moved a threshold distance from the first location. Alternatively or additionally, the media guidance application may determine that the user has stopped consuming the first media asset at the first location comprises detecting that the user has stopped interacting with a device at the first location.

The media guidance application may determine a trajectory of the user in response to determining that the user has stopped consuming the first media asset at the first location. For example, the media guidance application may determine the trajectory by determining a current location of the user and compare the first location to the current location. For example, by determining the difference between the current location of the user and the initial location of the user, the media guidance application may determine a direction of the user.

The media guidance application may identify a second location where the user will consume media content based on the trajectory. For example, the media guidance application may input the trajectory into a database listing locations associated with different trajectories from the first location, search the database, and receive an output of the second location in response to searching the database.

The media guidance application may search a database of quality of service levels at various locations to determine a quality of service available at the second location. For example, different locations may have different quality of service as measured by error rates, bit rates, throughput, transmission delay, availability, and/or jitter. The different quality of service may prevent some content (e.g., a high-definition video program) from being presented in both locations. For example, low quality of service in a location may allow for only low-definition video or audio programs to be presented.

The media guidance application may determine a characteristic of the first media asset. For example, the media guidance application may attempt to recommend a media asset for presentation at the second location that is the same or similar to a media asset recently consumed by the user at the first location. For example, the media guidance application may search for a second media asset that shares the same genre, subject matter, title, type, actor, character, and/or location. For example, the media guidance application may identify characteristics corresponding to the plurality of media assets available to the user at the second location and filter the plurality of media assets available to the user at the second location based on a presence of the characteristic.

The media guidance application recommends a second media asset from a plurality of media assets available to the user at the second location based on the characteristic and the quality of service. For example, the media guidance application may determine a plurality of content types consumed by the user during a period of time at the first location and determine the characteristic based on a content type of the plurality of content types most frequently consumed by the user. Moreover, the media guidance application may identify required quality of service levels corresponding to the plurality of media assets available to the user at the second location and filter the plurality of media assets available to the user at the second location based on whether or not the second location has the required quality of service.

In some aspects, the media guidance application may provide content recommendations based on user trajectories. The media guidance application may determine, using control circuitry, that a user has stopped consuming a first media asset on a first device. For example, the media guidance application may determine that the user has stopped consuming the first media asset on the first device by detecting that the user has moved from a first location corresponding to first device to a second location (e.g., the user has left the viewing area of the first device). In another example, the media guidance application may determine that the user has stopped consuming the first media asset on the first device by detecting that the user has stopped interacting with the first device (e.g., the user has not used the first device for a threshold period of time).

The media guidance application may determine, using the control circuitry, a trajectory of the user in response to determining that the user has stopped consuming the first media asset on the first device. For example, the media guidance application may determine a first location corresponding to the first device, determine a current location of the user, and compare the first location to the current location to determine the trajectory.

The media guidance application may identify, using the control circuitry, a second device corresponding to the trajectory. For example, the media guidance application may store a second location corresponding to the second device in memory, retrieve the second location of the second device from the memory, and determine that the second location corresponds to the trajectory. Additionally or alternatively, the media guidance application may recommend the second device based on a quality of service level for the second device being higher than a quality of service level for a third device.

The media guidance application may determine, using the control circuitry, a content provider for the second device. For example, the media guidance application may determine the content provider for the second device by searching a database listing content providers for various devices. In another example, the media guidance application may determine the content provider for the second device by querying the second device.

The media guidance application may determine, using the control circuitry, whether the first media asset is available through the content provider. For example, the media guidance application may determine whether the first media asset is available through the content provider by searching all media guidance data available for the content provider for the first media asset.

The media guidance application may provide, using the control circuitry, media guidance data (e.g., a channel number, navigation commands, etc.) for receiving the first media asset from the content provider in response to determining that the first media asset is available through the content provider. Additionally or alternatively, in response to determining that the first media asset is not available through the content provider, the media guidance application may identify a plurality of media assets available to the user at the second device, filter the plurality of media assets available to the user at the second device based on a comparison of the first media asset and the plurality of media assets available to the user at the second device, and recommend a second media asset from the plurality of media assets available to the user on the second device based on the comparison.

In some aspects, the media guidance application may provide content recommendations based on user trajectories. The media guidance application may determine, using control circuitry, that a user has stopped consuming a first media asset at a first location. For example, the media guidance application may determine that the user has stopped consuming the first media asset at the first location by detecting that the user has moved a threshold distance from the first location. In another example, the media guidance application may determine that the user has stopped consuming the first media asset at the first location by detecting that the user has stopped interacting with a device at the first location.

The media guidance application may determine, using the control circuitry, a trajectory of the user in response to determining that the user has stopped consuming the first media asset at the first location. For example, the media guidance application may determine the trajectory by determining a current location of the user, and comparing the first location to the current location.

The media guidance application may identify, using the control circuitry, a plurality of available locations (e.g., which may each correspond to a different device) for the user to consume media content based on the trajectory. For example, the media guidance application may identify the second location of the plurality of available locations where the user will consume media content based on the trajectory, by inputting the trajectory into a database listing locations associated with different trajectories from the first location, searching the database, and receiving an output of the second location in response to searching the database.

The media guidance application may search, using the control circuitry, a database listing a quality of service level for a second location of the plurality of available locations and a quality of service level for a third location of the plurality of available locations. For example, the first location may correspond to a first viewing area for a first device and the second location may correspond to a second viewing area for a second device.

The media guidance application may determine that the quality of service level for the second location is higher than the quality of service level for the third location. For example, the quality of service quality may be measured based on an error rate, bit rate, throughput, transmission delay, availability, or jitter.

The media guidance application may recommend, using the control circuitry, the second location based on the quality of service level for the second location being higher than the quality of service level for the third location. For example, the media guidance application may recommend a location that provides the best viewing experience for a user.

In some embodiments, the media guidance application may identify a plurality of media assets available to the user at the second location. The media guidance application may filter the plurality of media assets available to the user at the second location based on a comparison of the first media asset and the plurality of media assets available to the user at the second location. The media guidance application may then recommend a second media asset from the plurality of media assets available to the user on the second device based on the comparison. The media guidance application may also provide media guidance data for receiving the second media asset at the second location.

It should be noted that the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 5 shows an illustrative embodiment of a set of display screens used to provide recommended content, in accordance with some embodiments of the disclosure;

FIG. 11 is pseudocode describing the steps involved in selecting a media asset based on a quality of service at a location in accordance with some embodiments of the disclosure;

DETAILED DESCRIPTION

Figure 1:
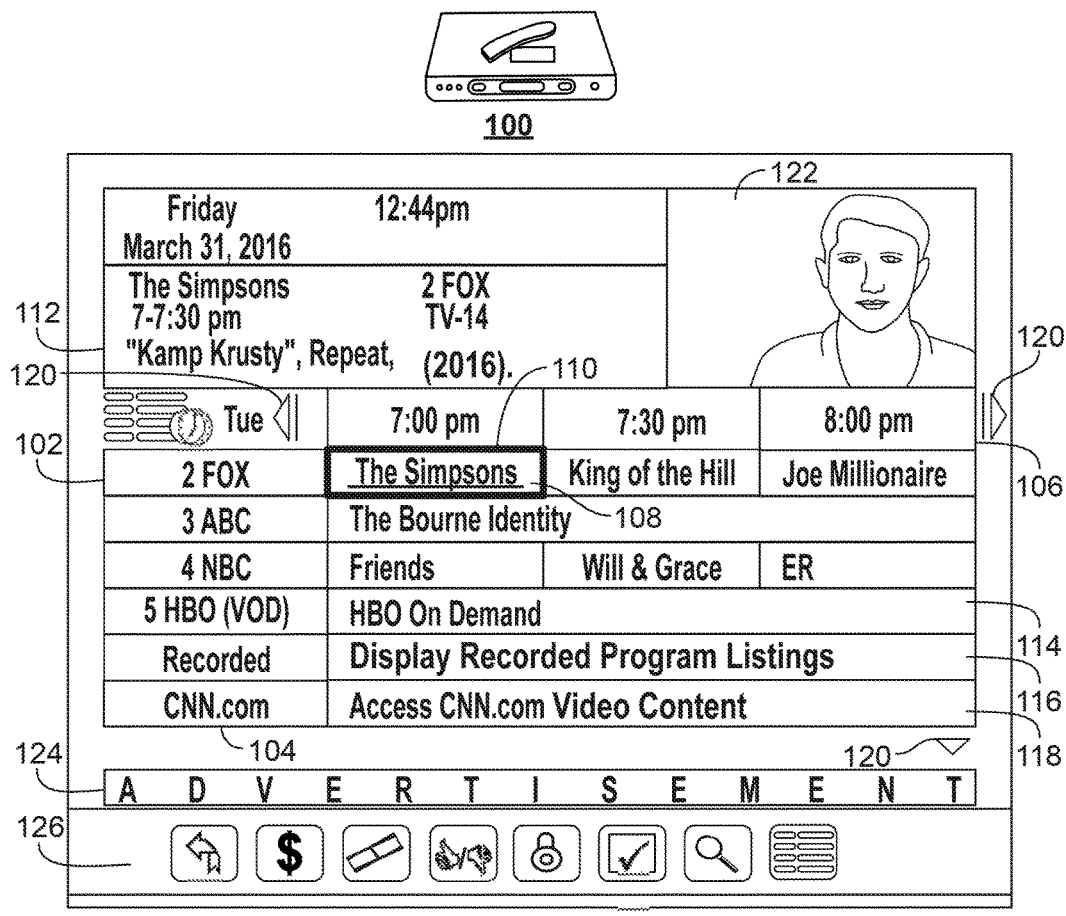
FIG. 1 shows an illustrative embodiment of a display screen that may be used to provide media guidance application listings and other media guidance information, in accordance with some embodiments of the disclosure.

Systems and methods are described herein for a media guidance application that recommends media content to a user based on the media content likely to be available to a user in at a given location or on a given device. As referred to herein, a "media guidance application" or a "guidance application" is an application that provides media guidance data to a user through an interface. For example, a media guidance application may allow users to efficiently navigate content selections and easily identify content that they may desire. The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

The media guidance application may also automatically determine the given location or given based on a current trajectory of the user, and recommend a media asset from the media content available at that location or on that device. As used herein, a "trajectory" of a user refers to a direction that a user is moving through space according to detected components. As used herein, a "component" of the trajectory refers to any characteristic of a user interaction that may affect the trajectory. For example, components may include the speed or velocity, the direction or angle, and/or any other measurement that may affect the trajectory. The trajectory may be expressed in any suitable units and is typically described in reference to a starting point. In some embodiments, the starting point is a first location or a location of a first device. The media guidance application may use the first location (or location of the first device) as described in suitable coordinates (e.g., global positioning coordinates) to determine where the trajectory of the user is likely to lead the user.

In some embodiments, a trajectory may also include a mode of transportation. For example, the media guidance application may determine whether the user is walking or driving a car to determine a location that the user may go or is going. In such cases, information about the mode of transportation may be used by the media guidance application. For example, locations of train stations (e.g., if the user is moving via a train) may be used by the media guidance application to determine a trajectory.

When determining a trajectory, the media guidance application determine a first location corresponding to a first device, first location, first viewing area, etc. associated with the previous coordinates (e.g., GPS coordinates) of the user. The media guidance application may then determine a current location of the user. For example, the media guidance application may detect a user through the use of updated GPS coordinates, object recognition, social media posts, and/or any other technique (e.g., as discussed below in relation to FIG. 3). The media guidance application may then compare the first location to the current location to determine the trajectory. For example, the media guidance application may determine a difference between two sets of coordinates to determine a direction of a user.

As used herein, "location" refers to any relative or absolute identifier of a position of a user or device. For example, the location of the user may be relative to a geographical coordinate, vector for direction, street address, name of building, or any other suitable identifier. In another example, the location may be relative to a property type (e.g., restaurant, hardware store, movie theatre, post-office, personal residence, place of business, etc.). As referred to herein, a "property type" refers to a location associated with a specific purpose, specific user, or function. For example, a first property type may be the home of a first user. A second property type may be the home of a second user. Furthermore, the media content available at one property type may differ from the media content available at the second property type. For example, the first user may subscribe to a different cable provider or OTT content provider than the second user. Thus, the media content available to the first user at the residence of the first user may be different than the media content available to the second user at the residence of the second user.

In some embodiments, the location may also refer to a coverage area. For example, the location may refer to a particular entity that governs, administers, controls, and/or provides network coverage for the location. For example, the media guidance application may determine that a first location may be associated with a first wireless network (e.g., a home network of a first user) and that a second location may be associated with a second wireless network (e.g., a home network of a second user). Moreover, a first location may refer to a geographic area with a first level of coverage (e.g., a first quality of service) and a second location may refer to a geographic area with a second level of coverage (e.g., a second quality of service). For example, while, in some embodiments, a location may be indicated by coordinates in a geographic coordinate system (e.g., latitude or longitude), or a global positioning system (GPS), in some embodiments, additionally or alternatively, a location may be determined by other information such as the property type, network coverage, and/or the amount, type, or accessibility of media content at the location.

In some embodiments, a location may be associated with one or more particular devices, content providers, quality of service, etc. Such information may be stored in a database either local or remote to the media guidance application. Furthermore, the database may be populated with information from a service provider, content provider, a user, and/or any third party. Additionally or alternatively, the media guidance application may query one or more devices to determine particular locations associated with the device. For example, each device may retrieve an associated location (or determine an associated location) based on GPS coordinates. A location may include one or more devices, in which each device is associated with a viewing area.

As used herein, a "viewing area" refers to the maximum distance from a user device, in all directions, in which a user could feasibly consume a media asset present on the user device. For example, if the user device is a television, the viewing area may refer to the maximum distance from the television at which the average user can understand the content presented. In some embodiments, the viewing area may correspond to a perceivable range. Various systems and methods for detecting whether or not a user is within a range are discussed in, for example, Shimy, U.S. Patent Application Publication No. 2011/0069940, published May 24, 2011, which is hereby incorporated by reference herein in its entirety.

In some cases, the size of a viewing area is a function of the obstacles surrounding the user device. For example, if a personal computer resides in a small room with walls that prevent a user on an opposite side of the walls from understanding content presented on the personal computer, then the viewing area of personal computer corresponds to the area within the walls. Alternatively, if one of the walls were removed, such that a user, formerly opposite of the removed wall from the personal computer, can now understand the content presented on the personal computer, the viewing area associated with the personal computer has now expanded in the direction of the removed wall.

In some cases, the size of a viewing area is a function of the objects surrounding the user device. For example, if a television resides in a room with other devices, the audio output of which prevent a user a particular distance away from the television from hearing content presented on the television, then the viewing area of the television corresponds to the maximum distance away from the television that the user can hear content presented on the television due to the audio output of the other devices. Alternatively, if one of the other devices were removed, such that a user that could not previously hear content presented on the television can now hear the content presented on the television, the viewing area associated with television has now expanded due to the removal of the other device.

In some embodiments, the viewing area associated with a user device may correspond to the predetermined proximity to the user device. Alternatively, the predetermined proximity may refer to another area, which may or may not be associated with geographical boundaries and/or distances. For example, the predetermined proximity may refer to a finite measurement of distance from a user device.

In another example, the predetermined proximity may refer to an area at which user devices may connect with a network (e.g., a home network), not necessarily the distance or other relationship of a user to the user device. For example, to determine whether or not a user is within a viewing area, the media guidance application may base its determination on whether or not the user device can connect to a home network. For example, a user device such as a smartphone may be carried by a user from a viewing area (e.g., an area where the user device can receive and consequently present a media asset) to an area outside the viewing area (e.g., an area where the user device cannot receive or present the media asset).

In another example, to determine whether or not a user device is within a viewing area of a user device, the media guidance application may base its determination on data received from a global positioning system (e.g., indicating that the user is within a particular geographical boundary and/or distance). In yet another example, to determine whether or not a user is within a predetermined proximity to a user device, the media guidance application may base its determination on whether or not a user input is received indicating that the first user is within the viewing area.

Figure 3:
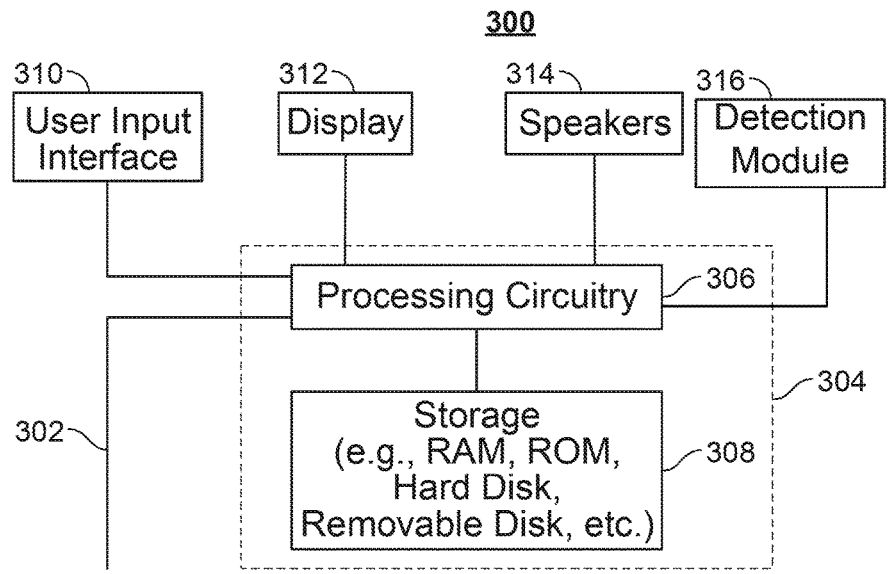
FIG. 3 is a block diagram of an illustrative device in accordance with some embodiments of the disclosure.

In some embodiments, the media guidance application may detect that a user in the viewing area has left the viewing area. For example, a detection module incorporated into or accessible by the media guidance application may monitor the viewing area to determine if and when a user is within or outside the viewing area. The media guidance application may employ numerous techniques for determining when a user enters or exits a viewing area as discussed in relation to detection module 316 (FIG. 3).

The media guidance application may receive this information in numerous ways. For example, the media guidance application may receive a user input that indicates the current geographic coordinates, property type, network coverage, and/or media content available at a location. For example, upon arriving at a location the media guidance application may receive a user input of a name of the location.

In some embodiments, a user device, upon which the media guidance application is implemented, may use GPS data (e.g., received from a GPS device incorporated into or accessible by the media guidance application that identifies the current geographic coordinates), object-recognition data (e.g., received from a object-recognition module incorporated into or accessible by the media guidance application that identifies an object associated with a particular location), or other data to determine the current location of the user.

As referred to herein, a media asset is "accessible" at a location based on whether or not a user may obtain a media asset for consumption on a permanent or temporary basis at one or more points in the future as a result, directly or indirectly, of subscribing to, paying for, or otherwise requesting the media asset. In some embodiments, the media guidance application may use additional criteria to determine whether or not a media asset is accessible from a service. For example, the media guidance application may determine that a media asset is accessible at a second location based on the subscription status of a device at that location with respect to one or more content providers that provide the media asset.

In some embodiments, the media guidance application may determine in which formats a media asset is accessible and what quality of service, as further described below, is necessary to receive that format. The media guidance application may use this information to determine whether or not a media asset is accessible from a location. For example, the media guidance application may determine that an on-line movie is accessible from one location (e.g., a first user's residence that has Wi-Fi access to the Internet). In another example, the media guidance application may determine that a radio broadcast is accessible from a second location (e.g., a car radio within the radio station's broadcast range).

In some embodiments, the media guidance application may recommend media content. Moreover, in order to recommend content having the greatest interest to a user at a particular time, the media guidance application bases the recommendations it is providing on content recently consumed by the user on a first device. Specifically, the media guidance application may monitor content that the user recently consumed on a first device (e.g., a set-top box connected to a television) and may then recommend other content for consumption to the user on a second device (e.g., smart phone) based on the content that the user recently consumed on the first device.

For example, just prior to a user leaving her home, the user may be watching a news story about an approaching winter storm on a television. When the user leaves her home, the media guidance application may determine that the user is likely going to her car. Therefore, the media guidance application may search content available in the user's car or on the user's smart phone (which may be accessed from the car) for programs that include information about the approaching winter storm. For example, if the media guidance application determines that the user does not have access to the same news program in her car that the user consumed in her house, the media guidance application may recommend similar content (e.g., a radio station news broadcast reporting on the winter storm). Additionally or alternatively, if the media guidance application determines that while the user does have access to the same news program in her car (e.g., she could watch the program on her smartphone) that the smartphone is unlikely to be able to receive the program due to quality of service issues, the media guidance application may recommend corresponding audio or textual data that will be less affected by the quality of service issues.

As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same.

In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

In some embodiments, the media guidance data provided by the media guidance application may appear as a recommendation of media content. For example, a user may consume content on an electronic tablet while commuting from work to her home. The media guidance application may determine that the user was watching romantic comedies on the electronic tablet during her commute, and based on that, recommend to the user other romantic comedies to watch on the user's television via a set-top box.

In some embodiments, a media guidance application may generate for display recommendations in response to determining that a user has stopped using a first device and is using a second device. To determine when a user is using or otherwise interacting with a particular device, the media guidance application may employ numerous techniques. For example, the first device may be a set-top box and a second device may be smart a phone. The media guidance application may determine that the user is using the set-top box by detecting user input (e.g., tuning to a specific channel) into the set-top box. The user may interact with the set-top box by direct contact, via a remote control, via another device, via voice commands, or any other means available to the user.

The media guidance application may catalogue the use of each device to determine whether or not a user is interacting with the device. For example, every time the media guidance application detects a user input into the set-top box, the media guidance application may start a timer to keep track of the amount of time passed since the user input. When the timer reaches a threshold number, the media guidance application may determine that the user has stopped using the set-top box. The media guidance application may also start monitoring other devices for user input. Once user input is detected on another device, the media guidance application may determine that the user is using a second device.

In some embodiments, the media guidance application may, in response to determining that the user has stopped using the first device and is using the second device, retrieve a threshold length of time from memory. As referred to herein, a "threshold length of time" is a length of time used to indicate media content recently consumed by a user on a device. For example, the threshold length of time may begin at a point in time when a user starts consuming media content on a second device (or stops consuming media content on a first device) and extend backwards through time to a point in time during which a user was consuming media content on a first device. The media guidance application may determine media content consumed by the user from the point in time during which the user was consuming media content on the first device to a point in time at which the user stopped consuming media content on the first device. The media guidance application may then identify the determined media content as media content recently consumed by the user. This recently consumed media content may be used by the media guidance application to determine additional media content (and/or determine criteria for the additional media content) that a user would like to consume on a second device when the user begins to consume media content on the second device.

The threshold length of time may be calculated in various units of measure. For example, the threshold length of time may be calculated in seconds, minutes, and/or other increments of time. Alternatively or additionally, the threshold length of time may be calculated in a number of media assets consumed by the user. For example, the threshold length may correspond to a particular number of songs previously consumed by the user. For example, the media guidance application may base recommendations for additional media content on a device on the last four songs previously consumed by a user on a different device.

The media guidance application may select the points in time that define the threshold length of time based on various criteria. For example, the points in time may be determined based on when a user started using a second device, when a user stopped using a first device, the length of time between using the first device and the second device, the type of device used to consume the media content, the type of content consumed by the user on the devices, etc.

For example, the media guidance application may be activated on a first device (e.g., an electronic tablet) and on a second device (e.g., a smart phone). When the user starts consuming media content on the electronic tablet, the media guidance application may activate a timer on the electronic tablet. When the media guidance application determines that the user stopped consuming the media content on the electronic tablet and started using the smart phone, it may transmit a request to the electronic tablet to stop the timer and to transmit the timer's elapsed time to the smart phone. Once the smart phone receives that elapsed time, the value may be stored in memory for later retrieval.

In another example, the media guidance application may store, in memory, a time when the user starts consuming media content on a first device ("Start Time"). When the media guidance application determines that the user is using the second device, it may request that the Start Time be transmitted from the first device to the second device. Once the media guidance application receives the Start Time on the second device, the media guidance application may calculate the threshold length of time based on the difference between the current time and the Start Time. The threshold length of time may then be stored in memory for later retrieval.

In yet another example, the media guidance application may determine that the user is consuming media content in intervals. The user may be consuming media content on an electronic tablet. The user may, for example, be watching Internet videos on the tablet. However, while watching the Internet videos, the user may be interrupted because she may need to help her children with their homework. While the user is helping her children with their homework, the Internet videos may be continuing to play on the electronic tablet, but the user is not consuming the videos during that time. The media guidance application may determine that the interruption is occurring by detecting, via a camera for example, that the user is not looking at the tablet. When the user is done helping her kids with their homework, she may resume watching the internet videos. As a result the media guidance application may store two threshold lengths of time in order to take into account the interruption.

In yet another example, the media guidance application may determine a threshold length of time based on the media asset the user was consuming last. For example, the user may be watching an episode of "Saved by the Bell" on a television via a set-top box. If the user has to leave her home, she may take her electronic tablet with her. The media guidance application may determine that the threshold length of time is the amount of time the user spent watching "Saved by the Bell" because the user may want to watch another "Saved by the Bell" episode on her electronic table.

In some embodiments, the media guidance application may determine a period of time beginning at a point in time when the user began using the second device and extending backwards for the threshold length of time. For example, the media guidance application may retrieve the current time from the second device and store it in memory as ending time for the period. The media guidance application may further determine the starting time for the period by subtracting the threshold length of time from the ending time. The ending time and the starting time together may then be stored in memory to indicate the period of time.

In some embodiments, the media guidance application may determine first media content consumed by the user on the first device during the period of time. For example, the media guidance application may determine that the user watched "Dumb and Dumber" and "The Big Bang Theory" on the first device (e.g., a television via set-top box). As part of determination, the media guidance application may analyze media content listings associated with the two media assets and may store the information in those content listings for retrieval at a later time.

In another example the user may have consumed media content on the first device (e.g., an electronic tablet) that does not have content listings associated with it (e.g., Internet videos). The media guidance application may store in memory characteristics associated with the consumed media content. As defined herein, a "characteristic" is any information about a media asset that may be used to categorize the media asset and/or distinguish the media asset from other media assets. For example, characteristics of media content may include any information about the media content as well as any information within the media content. For example, characteristics may be genre, title, length, source, actors, etc. If a user started watching an Internet video, the media guidance application may keep track of characteristics associated with the video. These characteristics may be retrieved from the Internet video itself, metadata associated with the video, or the Internet site that is making the Internet video available to users. Once the media guidance application retrieves these characteristics it may store them on the first device. These characteristics may later be sent to the second device.

In some embodiments, the media guidance application may determine a characteristic of the first media content. For example, if the user is listening to the radio while commuting in her car, she may be listening to rock music only. As a result the media guidance application may determine that "rock music" is a characteristic of the first media content. Alternatively, or additionally, the media guidance application may determine that a characteristic of the first media content is music by a specific rock band and/or artist based on the user listening to music by that rock band or artist.

In some embodiments, the media guidance application may determine the most popular or prevalent subset of media content recently consumed by the user. For example, all of the videos watched by the user may not have a common characteristic, but a subset of the videos may (e.g., the subset may correspond to a cooking show genre). The media guidance application may determine the characteristic based on that subset only. For example, if the media guidance application determines that a user watched a hockey game, three cooking shows, and a news program, the media guidance application may determine, based on the program listings associated with those programs, for example, that the programs have no common characteristics associated with them. However, the cooking shows have a common characteristic associated with them. As a result, the media guidance application may determine the characteristic of the first media content based on the cooking shows only.

In yet another example, the media guidance application may determine that the videos watched by the user may be divided into a number of subsets where each subset shares a characteristic. The media guidance application may determine that a characteristic of the first media content may be the subset that has the most videos associated with it. Alternatively or additionally, the media guidance application may determine multiple characteristics of the first media content. For example, these multiple characteristics may be based on the subsets described above. The media guidance application may further rank the subsets based on the amount of time the user consumed content associated with a particular subset. For example, if the user was watching a 2-hour movie on an electronic tablet and then a 15-minute news segment, the media guidance application may rank the subset that includes the 2-hour movie higher then the subset that includes the 15-minute news segment. Additionally, or alternatively, the media guidance application may rank the subsets based on the number of media assets in each subset. For example, the user may have listened to ten 3-minute rock songs on her smartphone and also watched an hour long episode of "Star Trek". The media guidance application may determine two characteristics for the consumed media content. The first characteristic may be "rock music" and the second "sci-fi shows". The ten rock songs may go into the first subset and "Star Trek" may go into the second subset. "Rock music" may be ranked higher because of ten songs in the subset versus only one show, despite the show being longer. There may be other ranking criteria for the characteristics. These can be ranked based on user preferences in the user profile. They can be also based on what content was consumed most recently and whether the user consumed the whole program associated with the characteristic or whether the user switched to another program in the middle.

In another example the ranks may be determined by a weighted average of some or all the methods described above. For example, if a user watched a 2-hour movie and listened to ten 3-minute songs, the media guidance application may determine that each 3-minute song is equivalent to consuming eighteen minutes of the movie. As a result the rank of the characteristic may be determined based on both the length of the media content and the number of the media assets.

In some embodiments, the media guidance application may recommend, based on the characteristic, second media content for consumption on the second device. For example, the media guidance application may receive the characteristic of the first media content on the second device. Once the second device receives the characteristic, the media guidance application may search media content available on the second device for media assets that match the characteristic. For example, the characteristic of the first media content consumed on a set-top box connected to a television may be "Sherlock Holmes," based on a user watching movies featuring this character. If the user switches to a smart phone as her second device, the media guidance application may search the smart phone for "Sherlock Holmes" media content. If the user's smart phone has access to media listings, the media guidance application may search those listings for "Sherlock Holmes." Additionally or alternatively, if the user's smart phone has access to the Internet through a cellular and/or Wi-Fi connection, the media guidance application may search Internet sites for content matching "Sherlock Holmes." As an example, the media guidance application may use any commercial search engine for this search. The media guidance application may narrow down the search, if appropriate, to only video assets (e.g., movies), audio assets (e.g., audio books, narratives), and/or textual content (e.g., short stories). If the media guidance application receives multiple characteristics on the second device, it may execute the search described above for each of the characteristics received and return media content recommendations corresponding to each characteristic. The characteristics may be ranked as described above. If the characteristics are ranked, the media guidance application may only present to the user media content associated with the highest ranked characteristic or it may present to the user content in order of the rankings.

In some embodiments, the media guidance application may store a list of devices associated with the user and recommend, based on the characteristic, the second media content for consumption on each device in the list of devices. For example, a user may have three devices associated with her (e.g., a set-top box connected to a television, an electronic tablet, and a smart phone). The user may be consuming media content on the set-top box connected to a television. The user may stop using the set-top box and start using the electronic tablet. As a result, the media guidance application may recommend media content available on the electronic tablet based on the characteristic. If the user later starts using her smart phone, the media guidance application may recommend media content available on the smart phone based on the characteristic.

As described herein, a media guidance application may verify a quality of service between a user device and one or more content providers. As referred to herein, "quality of service" refers to the quality, as received by an end user, in a telephone or computer network. The quality of service may be measured by and/or reflect one or more aspects of network services, such as error rates, bit rate, throughput lag, transmission delay, availability, jitter, etc. as seen from the viewpoint of the sender or receiver of information.

As described in Peuhkuri M., *IP Quality of Service*, Helsinki University of Technology, Laboratory of Telecommunications Technology, 1999., which is herein incorporated by reference, in packet-switched networks, quality of service is affected by various factors, which can be divided into "human" and "technical" factors. Human factors include: stability of service, availability of service, delays, user information. Technical factors include: reliability, scalability, effectiveness, maintainability, grade of service, etc.

The quality of service may be based on a minimum bandwidth and maximum delay that is acceptable. For example, a particular application (e.g., an application that includes videoconferencing and thus has places high demands on the network) may have different acceptable minimum bandwidth and maximum delay than another application (e.g., an application that is limited to textual data transmission and thus has lower demands on the network). For example, in order determine a guaranteed quality of service associated with different content providers, the media guidance application may compare the available bandwidth and maximum delay associated with each content providers. For example, for each content provider, the media guidance application may use the following formula to calculate maximum delay, $d_{max}$, where b is a token bucket depth, r is a bucket rate, p is a token bucket plus peak rate, M is a maximum datagram size, R is a bandwidth allocated to connection, $C_{tot}$ is a end-to-end sum of rate-dependent error terms, and $D_{tot}$ is a end-to-end sum of rate-independent, per-element error terms.

$$d_{max}=((b-M)/R)*(p-R)/(p-r))+(M+C_{tot})/(R+D_{tot}),$$
$$p>R\geq r$$

$$d_{max}=((b-M)/R)*(p-R)/(p-r))+(M+C_{tot})/(R+D_{tot}),$$
$$r\leq p\leq R$$

The media guidance application may then compare the quality of service for different content providers of the same media asset to determine which content provider of a particular media asset provides the highest quality of service to a user device. Based on this comparison, the media guidance application may select which content provider to use to offer a user device access to a media asset, may rank the various content providers, or may determine whether or not a media asset from the content provider should be offered to a user, as discussed below.

For example, quality of service may refer to a performance level that is required in order to provide particular types of content. For example, the delivery of content in a larger size or particular format may be more demanding on a network. Accordingly, to deliver such content to a user, the computer network may require a higher performance or achieved service quality (e.g., a high bit rate, low latency, and low bit error probability). The media guidance application may verify the performance level offered using a specific content provider is acceptable before the media guidance application offers media assets from that content provider for consumption by a user. By providing this verification service, the media guidance application ensures a high level of user experience. For example, because the performance level has been verified, the media guidance application will not facilitate a connection to a content provider the will result in a low quality of service and poor user experience.

To test for the various variables in determining quality of service, the media guidance application may measure bandwidth, jitter, latency, and packet loss. For example, the media guidance application may incorporate and/or have access to one or more modules to test for each characteristic of the quality of service. The testing may include querying one or more devices to generate statistics such as out-of-sequence counts and detecting errors in data packets such as checksum errors (e.g., according to a parity byte or parity word algorithm, modular sum algorithm, position-dependent algorithm, etc.). Additionally, the media guidance application may ping one or more devices for data to determine these measurements. For example, in order to test latency, the media guidance application may test both the near-end to far-end and the far-end to the near-end directions simultaneously.

In some embodiments, the media guidance application may determine a quality of service based on the weighted averages of one or more characteristics of the quality of service. As referred to herein, a "characteristic" of the quality of service is any variable that affects the quality of service. For example, the characteristics may include error rates, bit rate, throughput lag, transmission delay, availability, jitter, etc. as seen from the viewpoint of the sender or receiver of information. Additionally or alternatively, the characteristics may include any variable used to determine a maximum delay in a guaranteed quality of service, as discussed above. Moreover, the characteristics that are used to determine the quality of service may vary. For example, the media guidance application may select only characteristics for which statistical data may be generated, or for which the media guidance application may verify through suitable means. Additionally or alternatively, the characteristics may be selected based on industry standards, user selections, or a factory default.

Furthermore, the media guidance application may weigh each of these characteristics differently when determining the quality of service. For example, particular characteristics may in some situations be more indicative of the quality of service. For example, the data used to measure a first characteristic may be more precise, more accurate, more robust, etc. than the data used to measure a second characteristic. Accordingly, the media guidance appliance may weigh the first characteristic more heavily than the second characteristic in the determination of the quality of service.

It should also be noted that the quality of service (or the measurements of particular characteristics) may be determine continually or at predetermined times, and/or in response to particular inputs. For example, the media guidance application may continuously determine the quality of service for a user device to receive media assets from different content providers. At any time that the media guidance application requires the quality of service (e.g., in order to generate media listings from a particular content provider), the media guidance application may retrieve the current quality of service. Alternatively or additionally, the media guidance application may determine the quality of service at predetermined times (e.g., on the hour each hour). Alternatively or additionally, the media guidance application may determine the quality of service in response to a user request to access media assets, access an aggregation of content providers, accessing the media guidance application, turning on a user device, etc.

In some embodiments, the media guidance application may retrieve a threshold quality of service. A threshold quality of service may be any quality of service that triggers a particular action by the media guidance application. For example, the threshold quality of service may be based on an industry standard, a user selection, or a factory default. Moreover, the threshold quality of service may dynamically change depending on overall network conditions and/or user selections. For example, when network conditions become strained (e.g., there is an increase load on the system), the threshold quality of service may be decreased to allow for more media assets to be available to the user. Alternatively, when network conditions become strained, the threshold quality of service may be increased to ensure that the user experience is not affected by the network conditions. Likewise, when the user elects to lower the potential demand on the network (e.g., request only standard definition media assets), the threshold quality of service may be adjusted to reflect the lower demand on the network.

In some embodiments, determining that the user has stopped using the first device and is using the second device comprises detecting that the user has moved from a first location that is associated with the first device to a second location that is associated with the second device. For example, the user's home entertainment system may be associated with the user's home and the user's car entertainment system may be associated with the user's car. A user may be listening to music on her home entertainment system. When the media guidance application determines that the user has now activated her car entertainment system, the media guidance application may determine that the user stopped using the first device and is using the second device.

In some embodiments, determining that the user has stopped using the first device and is using the second device comprises detecting that the user has stopped interacting with the first device and is interacting with the second device. For example, a user may be using her smart phone to listen to music. The media guidance application may be detecting every user input into the smart phone and storing the time of the user input. The media guidance application may activate a timer when user input is detected and also store in memory the last input time corresponding to the current time. Once the timer reaches a threshold value, the media guidance application may make a preliminary determination that the user has stopped using the smart phone. The media guidance application may then monitor a second device for user input. If user input is detected on the second device, the media guidance application may determine that the user has stopped using the first device and is using the second device. However, if user input is detected on the first device after the threshold value has been reached, the media guidance application may update the last input time with a new time and restart the timer.

In some embodiments, the first media content comprises video content and the second media content consists of audio content. For example, the user may be watching a movie on a first device (e.g., electronic tablet) and then switch to a device that only supports audio (e.g., car radio). As a result, the characteristic of the first media content on the first device may be based on media content comprising video and the recommendation on the second device may be of an audio only content.

In some embodiments, the threshold length of time is based on an amount of time the user continuously used the first device immediately before using the second device. For example, a user may be consuming content on an electronic tablet throughout the day. She may watch the news in the morning, some soap operas in the afternoon, and some Internet videos and a news program in the evening. As a result, the media guidance application may store a threshold length of time based only on the time the user was consuming the Internet videos and the news program in the evening. Since the media content consumed in the morning and in the afternoon was not consumed continuously with the content consumed in the evening, this content is not used in the threshold length of time. Alternatively or additionally, the media guidance application may determine the characteristics based on sporadic use of the first device.

In some embodiments, determining the characteristic of the first media content comprises determining a plurality of content types consumed by the user during the period of time on the first device and determining the characteristic based on a content type of the plurality of content types most frequently consumed by the user. For example, the media guidance application may divide media content into content types, based on the characteristics of the media content. The types of media content may be movies, news programs, episodes of a series, music, music videos, cartoons, sporting events, sitcoms, etc. Media content may be further subdivided. For example, movies may be divided into action, comedies, romance, documentaries, classics, children, dramas, horror, thrillers, etc. Cartoons may be divided into adult cartoons and children's cartoons. The media guidance application may determine the characteristic of the media content based on media content listings associated with specific media assets, it may be retrieving those characteristics from a website providing the media assets, it may be accessing meta-data associated with the media assets for the characteristics, or it may be retrieving that information from a database. An example of such a database may be found at www.imdb.com. The media guidance application may determine that the user has consumed sitcoms, news programs and music videos on the first device. The media guidance application may determine the type of content of each of those media assets, based on the media content listings for those media assets. The media guidance application may then determine which type of media content the user has consumed most frequently. For example, the user may have consumed a total of three hours of media content on the first device. The user may have consumed two hours of sitcoms, thirty minutes of music videos, and a thirty minute news program. As a result, the media guidance application may determine the characteristic based on only the two hours of sitcoms that the user consumed. In another example, the media guidance application may determine the characteristic of the first media content based on the type of content the user consumed last. As a result, in the example above, if the user consumed two hours of sitcoms, a thirty minute news program, and thirty minutes of music videos in that order, the media guidance application may determine the characteristic of the first media content based on the thirty minutes of music videos only.

In some embodiments, the media guidance application may generate an alert that indicates to the user that the second media content is available on the second device. An "alert," as defined herein, may be any communication to a user that apprises the user of one or more occurrences. For example, the alert may alert the user of the availability of media content recommendations that are based on content recently consumed by the user on a different device. It should be noted that the alert may include audio, video, and/or text based alerts.

In some embodiments, an alert may be generated together with a listing of recommended media content. For example, if a media guidance application determines that a content recommendation is available, the media guidance application may notify the user of the availability of the media content recommendation by having the second device alert the user (e.g., through a vibration, an audio tone, a visual cue, etc.). The media guidance application may alert the user of the available media content recommendation in different ways based on the type of media content that is available. For example, if the available recommendation is for a movie, the media guidance application may notify the user through a visual cue. If the recommendation is for a song, the media guidance application may generate an audio tone. The media guidance application may also notify the user of the number of media assets recommended to the user. For example, if the media guidance application determines that three media assets are being recommended to a user, the media guidance application may cause the electronic tablet to vibrate three times. Of course, if many media assets are recommended, the media guidance application may vibrate a maximum of five times in order to avoid irritating the user. Additionally or alternatively, the media guidance application may generate for display, to the user, a visual cue of a number of media assets that are recommended.

As referred herein, the term "in response to" refers to initiated as a result of. For example, a first action being performed in response to another action may include interstitial steps between the first action and the second action. As referred herein, the term "directly in response to" refers to caused by. For example, a first action being performed directly in response to another action may not include interstitial steps between the first action and the second action.

Figure 2:
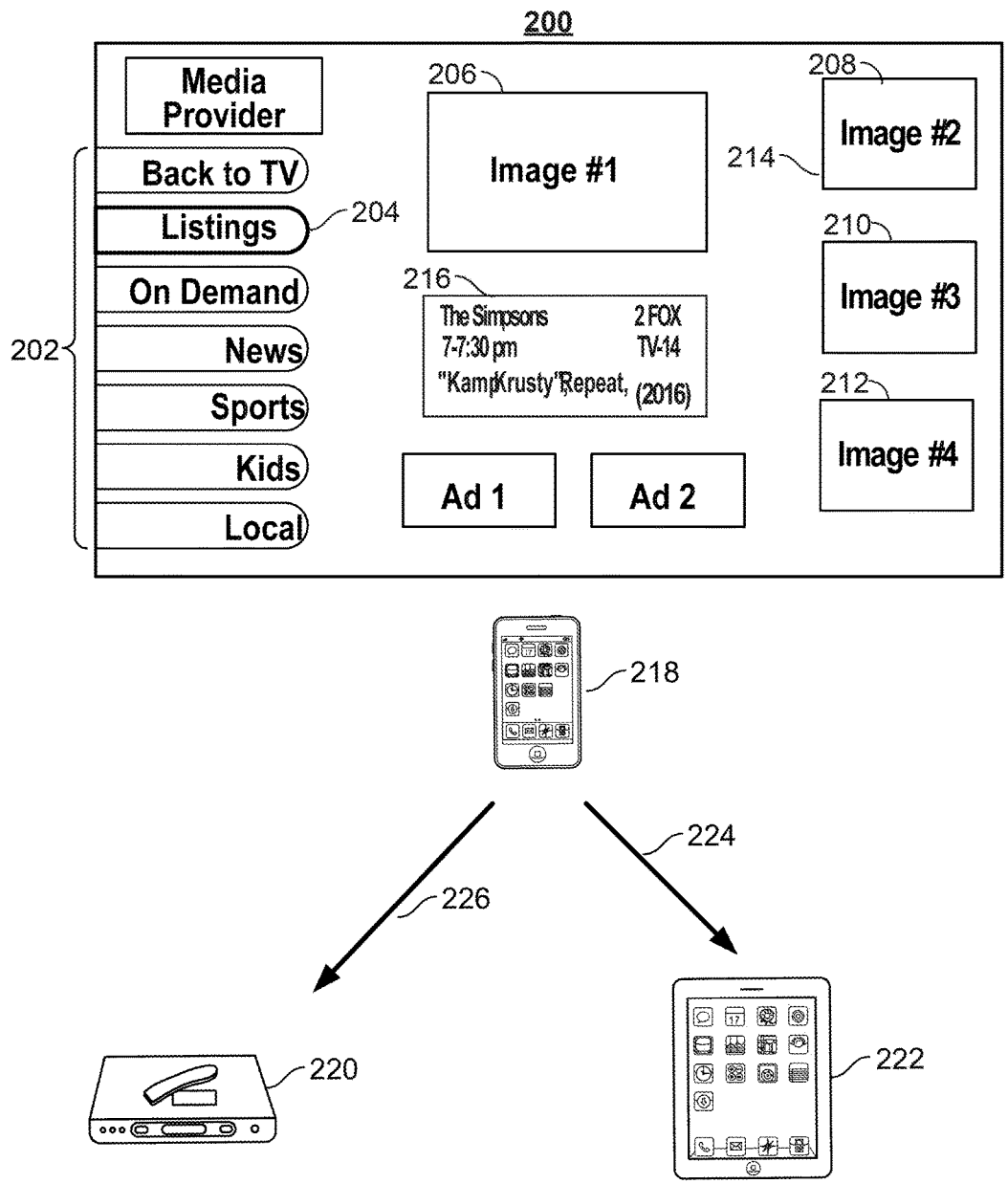
FIG. 2 shows another illustrative embodiment of a display screen that may be used to provide media guidance application listings, in accordance with some embodiments of the disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

Media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Media guidance applications may generate graphical user interface screens that enable a user to navigate among, locate and select content. An example of a media guidance application is shown in FIG. 1.

FIG. 1 shows illustrative grid of a program listings display 100 arranged by time and channel that also enables access to different types of content in a single display on user device 130. Device 130 may corresponds to a first location, whereas device 132 may correspond to a device in a second location.

Furthermore, a media asset accessed on device 130 may be selected for display on device 132 as described below. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200, shown on device 218, includes selectable options 202 for content information organized based on content type, genre, and/or other organization criteria. Device 218 may correspond to a first location, whereas device 220 may correspond to a device in a second location, and device 222 may correspond to a device in a third location. Furthermore, a media asset accessed on device 218 may be selected for display on device 220 or 222 as described below.

Furthermore, device 220 may be reached via trajectory 226, whereas device 222 may be reached via trajectory 224.

In some embodiments, the media guidance application may determine which device (e.g., device 220 or 222) or which location (e.g., associated with either device 220 or device 222) a user is approaching based on determining that the user is following a determined trajectory (e.g., trajectory 226 or 224).

In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 312 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

User equipment device 300 may also incorporate or be accessible to detection module 316. For example, detection module 316 may identify particular users and/or the movements of the particular user. For example, via detection module 316, the media guidance application may determine when a user enters and/or exits a location and/or a viewing area associated with a media asset and/or a display device. Detection module 316 may also determine the trajectory of one or more users. Detection module 316 may further include various components (e.g., a video detection component, an audio detection component, etc.).

In some embodiments, detection module 316 may include a content recognition module to determine the content of a presented media asset (e.g., whether or not an advertisement, content of interest to a user, etc.) is being presented, the number of people in a viewing area, and/or a location. The content recognition module may use object recognition techniques such as edge detection, pattern recognition, including, but not limited to, self-learning systems (e.g., neural networks), optical character recognition, on-line character recognition (including but not limited to, dynamic character recognition, real-time character recognition, intelligent character recognition), and/or any other suitable technique. For example, the media guidance application may receive data in the form of a video. The video may include a series of frames. For each frame of the video, the media guidance application may use a content recognition module or algorithm to determine the people (including the actions associated with each of the people) in each of the frames or series of frames and/or where each identified person is looking. Alternatively or additionally, for each frame of the video, the media guidance application may use a content recognition module or algorithm to determine the content of one or more frames of a media asset. The media guidance application may then compare the determined content to user preference information (e.g., retrieved from a user profile).

In some embodiments, the content recognition module or algorithm may also include speech recognition techniques, including but not limited to Hidden Markov Models, dynamic time warping, and/or neural networks (as described above) to translate spoken words into text and/or processing audio data. The content recognition module may also combine multiple techniques to determine the content of a presented media asset (e.g., whether or not an advertisement, content of interest to a user, etc.) is being presented, the number of people in a viewing area, and/or the level of engagement of each person in the viewing area (e.g., whether or not a person is interacting with a device). For example, a video detection component of the detection module may generate data indicating that two people are within a viewing area of a user device. An audio component of the detection module may generate data indicating that the two people are currently engaged in a conversation about the media assets (e.g., by determining and processing keywords in the conversation).

In addition, the media guidance application may use multiple types of optical character recognition and/or fuzzy logic, for example, when processing keyword(s) retrieved from data (e.g., textual data, translated audio data, user inputs, etc.) describing the engagement of a user (or when cross-referencing various types of data in databases). For example, if the particular data received is textual data, using fuzzy logic, the media guidance application (e.g., via a content recognition module or algorithm incorporated into, or accessible by, the media guidance application) may determine two fields and/or values to be identical even though the substance of the data or value (e.g., two different spellings) is not identical. In some embodiments, the media guidance application may analyze particular received data of a data structure or media asset frame for particular values or text using optical character recognition methods described above in order to determine the engagement of a user. The data received could be associated with data describing the engagement of the user and/or any other data required for the function of the embodiments described herein. Furthermore, the data could contain values (e.g., the data could be expressed in binary or any other suitable code or programming language).

In some embodiments, detection module 316 may also detect other user actions and/or movements. For example, if the media guidance application determines that a user is currently accessing another media asset on a second device, the media guidance application may determine that the user is not viewing a media asset on a first device despite being within a viewing area. However, if the content on the second device is similar (e.g., relates to the same subject matter, product, genre, etc.) to the content associated with the first device, the media guidance application may determine that the user is viewing the media asset on the first device. Alternatively or additionally, detection module 316 may determine (e.g., via querying a device, object recognition, etc.) whether or not is interacting with a device. For example, if the user does not interact with a device for a threshold time period (e.g., a period of time representative of a user no longer interacting with a device), the media guidance application may determine that the user has stopped consuming a media asset on the device (or location associated with that device). Alternatively or additionally, detection module 316 may determine (e.g., via querying a device, object recognition, etc.) whether or not is a threshold distance from a device. For example, if the user is a threshold distance (e.g., a distance representative of a user no longer interacting with a device), the media guidance application may determine that the user has stopped consuming a media asset on the device (or location associated with that device). It should be noted that the "thresholds" described herein may be supplied by a user or may be automatically selected. Automatically selected thresholds may have a default setting (e.g., determined by a third party) that may be updated based on a user's history. For example, the actual thresholds may be tailored to a particular user (e.g., a user that typically stands further away from a device when using the device may has a higher threshold distance than a user that stands closer to the device when using the device).

The media guidance application (e.g., via detection module 316) may also verify a user interest through other means. For example, the media guidance application, using a detection module (e.g., detection module 316 (FIG. 3)), may query the search history associated with a search engine accessed from a second device (e.g., a smartphone or tablet computer) being used by a user within the viewing area of the display device associated with the media guidance application. Upon detecting that the user previously searched for information similar to the information currently presented by the user device, the media guidance application may determine that the user in viewing the media asset.

In another example, the media guidance application, using a detection module (e.g., detection module 316 (FIG. 3)), may analyze keywords within a conversation between users occurring within the viewing area of a display device. If any of the keywords describe an interest in the content presented on the user device (e.g., as determined by a cross-reference with a database indicating words indicative of an interest in the content), the media guidance application may determine that the user is viewing the media asset.

The media guidance application may also receive (e.g., via detection module 316 (FIG. 3)) user-generated data (e.g., status updates, microblog posts, etc.) describing a media asset and/or advertisement generated for display by the media guidance application. For example, if a user posts an update to a social media website that he/she is currently enjoying a media asset, the media guidance application may determine the user is viewing the media asset. Likewise, if a user posts an update to a social media website that he/she is currently going to a restaurant, the media guidance application may determine the trajectory of the user based on a location of the restaurant.

As used herein, a "social network," refers to a platform that facilitates networking and/or social relations among people who, for example, share interests, activities, backgrounds, and/or real-life connections. In some cases, social networks may facilitate communication between multiple user devices (e.g., computers, televisions, smartphones, tablets, etc.) associated with different users by exchanging content from one device to another via a social media server. As used herein, a "social media server" refers to a computer server that facilitates a social network. For example, a social media server owned/operated/used by a social media provider may make content (e.g., status updates, microblog posts, images, graphic messages, etc.) associated with a first user accessible to a second user that is within the same social network as the first user.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
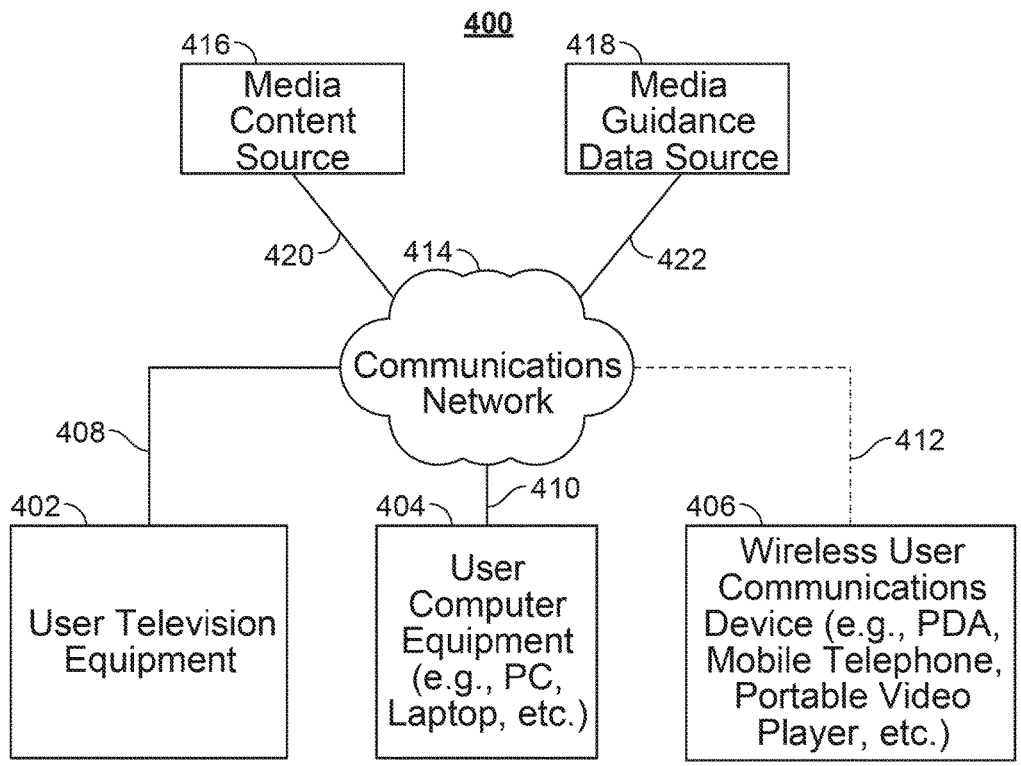
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

FIG. 5 shows an illustrative example of screens used to generate for display recommendations to a user. Display screen 500 presents a display 502 of program listings and an alert 504 which indicates availability of recommended content. For example, in display screen 500, the media guidance application has determined that media content is available on a second device based on a characteristic of media content consumed by a user on a first device. For example, the media guidance application (e.g., via control circuitry 304 (FIG. 3)) may determine that media content available on the second device has similar characteristics to media content recently consumed on a first device. As a result, the media guidance application generated for display alert 504. Alert 504 may be selectable by the user. When the user selects alert 504, the media guidance application may present to the user display 550.

Alternatively or additionally, the media guidance application may automatically, without user input, generate for display listings for media content available on the second device that has similar characteristics to media content recently consumed on a first device. For example, in response to a user powering on the second device, the media guidance application may cause media listings to appear (or begin playback of a media asset) on a display (e.g., display 312 (FIG. 3)) on the second device.

Display 550 may present to the user one or more media listings 552 of media assets available on the second device based on the characteristic of media content consumed by the user on the first device. The presented media listings 552 may include information about the media asset (e.g., title, length, etc.). The presented media listings 552 may also be user-selectable. When the user selects one of the media listings 552, the user may be given more information about the media asset. Additionally or alternatively, the user may be given an option to start consuming the media asset and/or an option to instruct the media guidance application to never recommend the selected media asset again.

Furthermore, media listings 552 may represent media content that was available on the first device or may represent media content that was not available on the first device. For example, media listings 552 may represent media content that is formatted for display on the second device. For example, if the second device has only standard definition resolution, media listing 552 may represent standard definition version of media content available in high definition on the first device. In another example, if the second device has only audio output capabilities, media listing 552 may represent audio-only versions of media content available in audio and video on the first device. In yet another example, if the second device has access to only non-subscription media content, media listing 552 may represent only non-subscription media content similar to the subscription media content available on the first device.

In some embodiments, the graphic properties of alert 504 may vary based on the media content that is the subject of the alert. For example, the color of alert 504 may represent how popular the recommended content is on social media sites. The color red may indicate that the recommended media content is very popular and blue may indicate that the recommended media content is not very popular. Alert 504 may be of a number of other colors that may indicate different degrees of popularity of the recommended media content. The color of alert 504 may also represent a number of media assets available. For example, red may indicate ten or more media assets available, green may represent availability of at least five recommended assets but no more than ten, and blue may represent one to four recommended media assets available. Additionally or alternatively, alert 504 may have a number inside of the circle that may represent a number of recommended media assets available.

Figure 6:
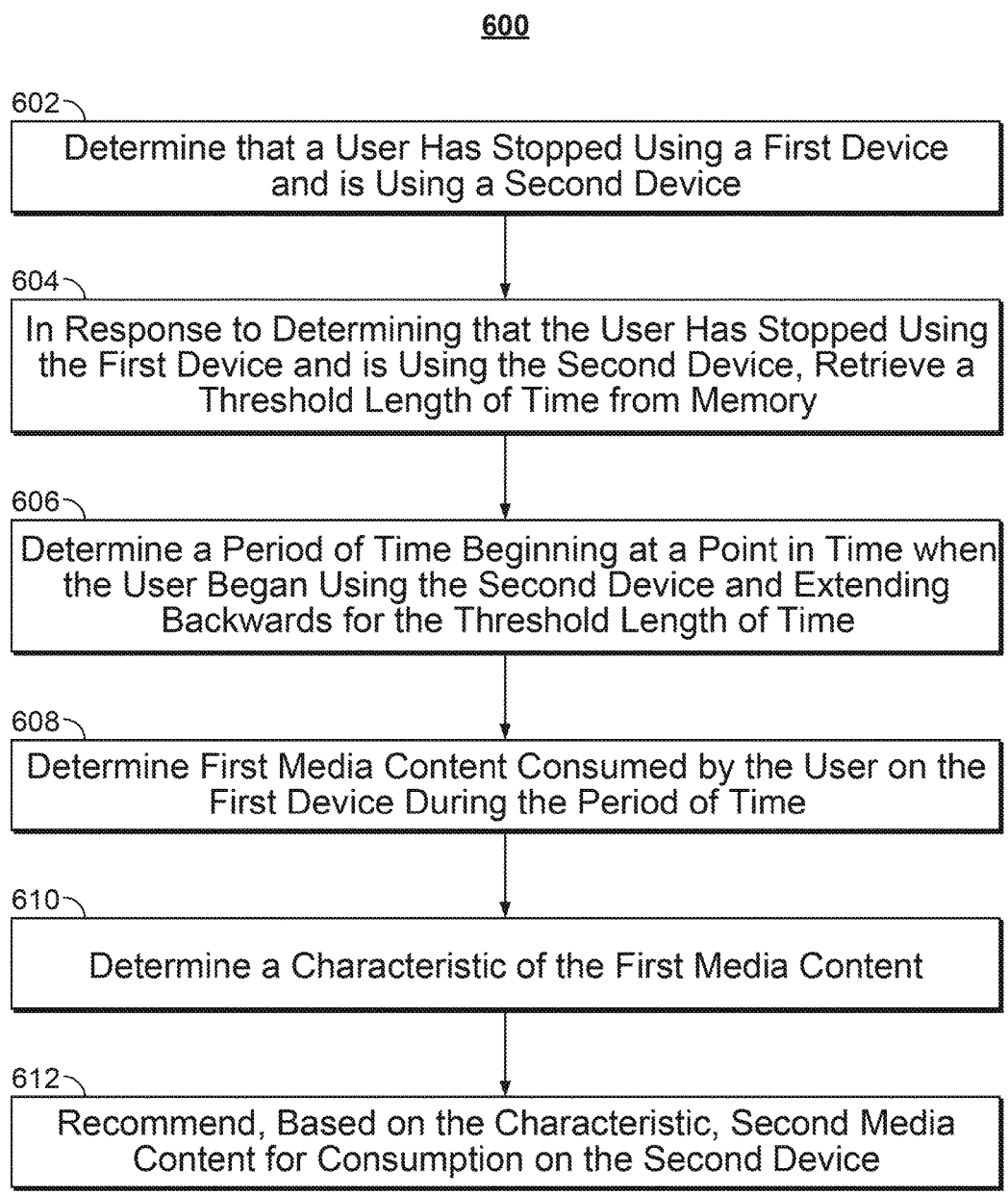
FIG. 6 is a flowchart of illustrative steps involved in recommending content on a second device based on content recently consumed by a user on the first device, in accordance with some embodiments of the disclosure.

FIG. 6 is a flowchart of illustrative steps involved in recommending content on a second device based on content consumed by a user on a first device. It should be noted that process 600 or any step thereof could be performed on, or provided by, any of the devices shown in FIGS. 3-4. For example, process 600 may be executed by control circuitry 304 (FIG. 3) as instructed by a media guidance application implemented on user equipment 402, 404, and/or 406 (FIG. 4) in order to distribute control of media guidance application operations for a target device among multiple user devices. In addition, one or more steps of process 600 may be incorporated into or combined with one or more steps of any other process or embodiment (e.g., as described in FIGS. 7-13).

At step 602, a media guidance application determines (e.g., via control circuitry 304 (FIG. 3)) that a user has stopped using a first device and is using a second device. For example, as discussed above the media guidance application may determine that the user has stopped using the first device and is using the second device by determining that the user has moved from a location that is associated with a first device to a location associated with the second device. For example, the first device may be a set-top box and the second device may be a car entertainment system. Both the first device and the second device may have components of user device 300 (FIG. 3). The user may associate the first device with the user's home via user input interface 310 (FIG. 3) available on the first device. The user may further associate the second device with the user's car via user input interface 310 (FIG. 3) available on the second device. The media guidance application may determine via processing circuitry 306 (FIG. 3) that the user stopped using the first device and started using the second device. For example, when the user drives her car, the media guidance application may (e.g., via a global positioning module accessible by control circuitry 304 (FIG. 3)) automatically determine that the user is no longer at home.

As described above the media guidance application may also determine (e.g., via control circuitry 304 (FIG. 3)) that the user has stopped using a first device and is using the second device by detecting that the user stopped interacting with the first device and is interacting with the second device. Both the first and second device may have components of device 300 (FIG. 3). The media guidance application may detect, via user input interface 310 (FIG. 3), user input into the first and second devices. The media guidance application may further start a timer via processing circuitry 306 (FIG. 3) to keep track of the amount of time passed since each input. When the timer reaches a threshold value which can be stored in storage 308, the media guidance application may determine that the user has stopped using the first device. After the threshold value is reached on the first device, the media guidance application may start monitoring the second device for user input. Once user input is detected on the second device, the media guidance application may determine that the user is using the second device.

In yet another example, the user may indicate to the media guidance application, via user input interface 310 (FIG. 3), that he is about to stop using the first device. The media guidance application may provide to the user a selectable indication, via display 312 (FIG. 3), that when selected by the user, via user input interface 310 (FIG. 3), indicates that the user is about to stop using the first device. Once the user selects the indication via user input interface 310 (FIG. 3), the media guidance application may present to the user via display 312 (FIG. 3) one or more devices associated with the user, for the user to select as the second device.

In step 604, in response to determining that the user has stopped using the first device and is using the second device, the media guidance application retrieves (e.g., via control circuitry 304 (FIG. 3)) a threshold length of time from memory (e.g., storage 308 (FIG. 3) and/or any location accessible via communications network 414 (FIG. 4)). For example, the media guidance application may be active on a device such as device 300 (FIG. 3). The threshold length of time may be retrieved from RAM which may be part of storage 308 (FIG. 3). Alternatively or additionally, the threshold length of time may be retrieved from any other component of storage 308 (e.g., ROM, Hard Disk, Removable Disk, etc.) or from any location accessible via communications network 414 (FIG. 4)).

In step 606, the media guidance application determines (e.g., via control circuitry 304 (FIG. 3)) a period of time beginning at a point in time when the user began using the second device and extending backwards for the threshold length of time. For example, the media guidance application may retrieve via processing circuitry 306 (FIG. 3) from storage 308 (FIG. 3) the current time. The media guidance application may then, via processing circuitry 306 (FIG. 3), calculate a time period based on the threshold length of time retrieved via circuitry 306 (FIG. 3) and the current time. The time period may further be stored in storage 308 (FIG. 3) as a combination of two values (e.g., start time and end time).

In step 608, the media guidance application determines (e.g., via control circuitry 304 (FIG. 3)) first media content consumed by the user on the first device during the period of time. For example, the media guidance application may request, via communications network 414 from the first device, media content identifiers for media content consumed by the user on the first device during the period of time on the first device. The request may include a start time and an end time that content identifiers are needed for. The identifiers may include information needed to determine a characteristic of the media content. Alternatively or additionally, the media guidance application on the first device may keep track, via processing circuitry 306 (FIG. 3), of information about media content the user is consuming on the first device and the time interval for the consummation. That information may include characteristics of the media content. The media guidance application may transmit the information over communications network 414 (FIG. 4) to media guidance data source 418, where that information may be stored in a database. When the media guidance application needs to determine what content the user has consumed during the time period, the media guidance application may request that information from media guidance data source 418 (FIG. 4) over a communications network 414 (FIG. 4).

In step 610, the media guidance application determines (e.g., via control circuitry 304 (FIG. 3)) a characteristic of the first media content. The media guidance application may receive from the first device and/or media guidance data source 418 over communications network 414, data associated with media content that the user consumed on the first device during the time period. The media guidance application may cross-reference, via processing circuitry 306 (FIG. 3), parts of the media content consumed by the user in order to determine if that content has at least one characteristic associated with it. If all of the media content consumed by the user does not share one characteristic, the media guidance application may, as described above, determine, via processing circuitry 306 (FIG. 3), a characteristic of a subset of the consumed media content. The media guidance application may determine multiple characteristics of the consumed media content based on multiple subsets.

In step 612, the media guidance application (e.g., via control circuitry 304 (FIG. 3)) recommends, based on the characteristic, second media content for consumption on the second device. For example, the media guidance application may be activated on, or send instructions to, the second device. The media guidance application may retrieve, from storage 308 (FIG. 3), a characteristic of the media content consumed on the first device. The media guidance application may then search, using control circuitry 306 (FIG. 3), media content on the second device that matches the characteristic. For example, the second device may have program listings stored in storage 308 (FIG. 3) for media content available on the device. The media guidance application may search media content listings of the second device for the characteristic. If the characteristic is a name of an actor, the media guidance application may do a textual comparison, via processing circuitry 306 (FIG. 3), between media content listings data and the actor's name. If any matches are found, the media guidance application may recommend the media content associated with matched media content listings to the user via display 312 (FIG. 3).

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 6.

Figure 7:
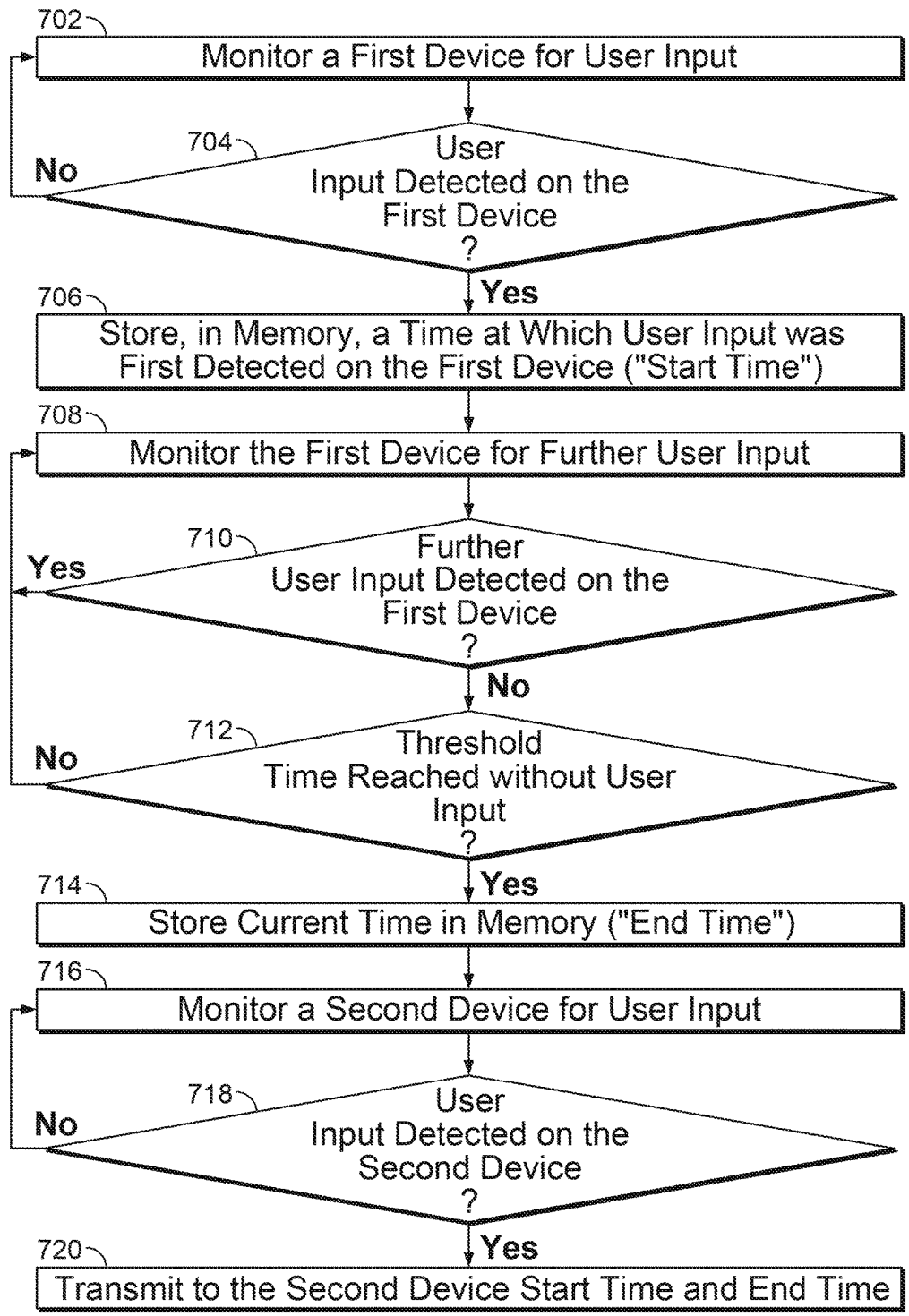
FIG. 7 is a flowchart of illustrative steps involved in determining that a user stopped using a first device and is using a second device, in accordance with some embodiments of the disclosure.

FIG. 7 is a flowchart of illustrative steps involved in determining that a user stopped using a first device and is using a second device. It should be noted that process 700 or any step thereof could be performed on, or provided by, any of the devices shown in FIGS. 3-4. For example, process 700 may be executed by control circuitry 304 (FIG. 3) as instructed by a media guidance application implemented on user equipment 402, 404, and/or 406 (FIG. 4) in order to distribute control of media guidance application operations for a target device among multiple user devices. In addition, one or more steps of process 700 may be incorporated into or combined with one or more steps of any other process or embodiment (e.g., as described in FIGS. 6 and 8-13).

At step 702, the media guidance application monitors (e.g., via control circuitry 304 (FIG. 3)) a first device for user input. For example, the media guidance application may be active on a set-top box which may have components of device 300 (FIG. 3). The user may be interacting with the set-top box via a remote control. The remote control may be sending IR signals to user input interface 310 (FIG. 3). An example of a user input may be the user, via a remote control, tuning the set-top box to a specific channel.

At step 704, the media guidance application detects, via control circuitry 304 (FIG. 3), whether a user input has been detected on the first device. If user input has not been detected, the media guidance application continues to monitor the first device for user input. If the media guidance application detects user input, the process moves to step 706.

At step 706, the media guidance application stores, in memory, a time at which user input was first detected on the first device. The stored time may represent a time when the user first started using the first device and may be stored as ("Start Time"). For example, if the media guidance application determines, via control circuitry 306 (FIG. 3), that user input was detected, it may retrieve the current time from storage 308 (FIG. 3). The media guidance application may then store the retrieved time in another section of storage 308 (FIG. 3) as Start Time. The media guidance application may also store the retrieved time again as ("Last Input Time"). The media guidance application may also start a timer, via control circuitry 306 (FIG. 3), in order to keep track of the time passed after user input.

At step 708, the media guidance application monitors (e.g., via control circuitry 304 (FIG. 3)) the first device for further user input. The media guidance application may monitor the first device for further user input in the same manner as it monitors it in step 702. However, if the first device is an electronic tablet, the user may not be interacting with it via a remote control. The user may be utilizing a touch interface of an electronic tablet for user input. The touch interface may be sending user interactions with the device to a user input interface 310 (FIG. 3). User input interface 310 (FIG. 3) may be interpreting user input and sending user input as user commands to processing circuitry 306 (FIG. 3). Processing circuitry 306 (FIG. 3) may then be executing the commands.

At step 710, the media guidance application determines (e.g., via control circuitry 304 (FIG. 3)) whether further user input has been detected on the first device. If the media guidance application determines, via control circuitry 306 (FIG. 3), that further input into user input interface 310 (FIG. 3) was detected, it may update the Last Input Time by retrieving the current time from storage 308 (FIG. 3), and storing the retrieved time again in storage 308 (FIG. 3) as Last Input Time. The media guidance application may also stop, reset and restart the counter started in step 708. The media guidance application may then continue monitoring the first device for further user input. If further user input is not detected on the first device, the media guidance application continues to step 712.

In step 712, the media guidance application determines (e.g., via control circuitry 304 (FIG. 3)) whether a threshold time without user input has been reached. The threshold time without user input may be determined beforehand and stored in storage 308 (FIG. 3). Initially, the threshold time may be set to an arbitrary number, however, as the media guidance application executes process 700 repeatedly, the threshold time may be adjusted based on threshold times of earlier executed processes 700. The media guidance application may compare, via processing circuitry 306 (FIG. 3), the stored threshold time since last user input with the time elapsed on the timer of steps 708 and 710. If the threshold time has not been reached, the media guidance application will continue monitoring the first device for further user input (step 708). If the threshold time has been reached, then process 700 will move to step 714.

In step 714, the media guidance application stores current time in memory (e.g., storage 308 (FIG. 3) and/or any location accessible via communications network 414 (FIG. 4)). The media guidance application may retrieve current time in the same manner as in step 706 and store it in storage 308 (FIG. 3) as ("End Time") to signify that the user stopped using the first device.

In step 716, the media guidance application monitors (e.g., via control circuitry 304 (FIG. 3)) the second device for user input. The media guidance application may monitor the second device for user input in the same manner as it monitors the first device in steps 702 and 708. In another example, if the second device is a car entertainment system, user input may be the user starting the car and as a result turning on the car entertainment system. Turning on the car may be considered user input in the context of the car entertainment system.

In step 718, the media guidance application determines (e.g., via control circuitry 304 (FIG. 3)) whether user input has been detected on the second device. The media guidance application may detect user input on the second device in the same manner as it detects user input on the first device in steps 704 and 710. Additionally or alternatively, the media guidance application may detect, via a microphone, the user's voice commands. The microphone may transmit the user's voice commands to user input interface 310 (FIG. 3). User input interface 310 (FIG. 3) may interpret the user's voice commands and transmit them to processing circuitry 306 (FIG. 3) for execution. If user input is not detected on the second device, the media guidance application may continue monitoring the second device for user input. Alternatively or additionally, the media guidance application may monitor multiple devices for user input. The device that receives user input at step 718 may be labeled as the second device.

At step 720, the media guidance application transmits (e.g., via control circuitry 304 (FIG. 3)) to the second device Start Time and End Time. For example, the media guidance application may be active on the first device and the second device. When user input on the second device is detected, the media guidance application may transmit from the first device, via communications network 414 (FIG. 4), a request for a Start Time and End Time stored in storage 308 (FIG. 3) of the first device. The media guidance application may then receive the Start Time and End Time from the first device.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 7.

Figure 8:
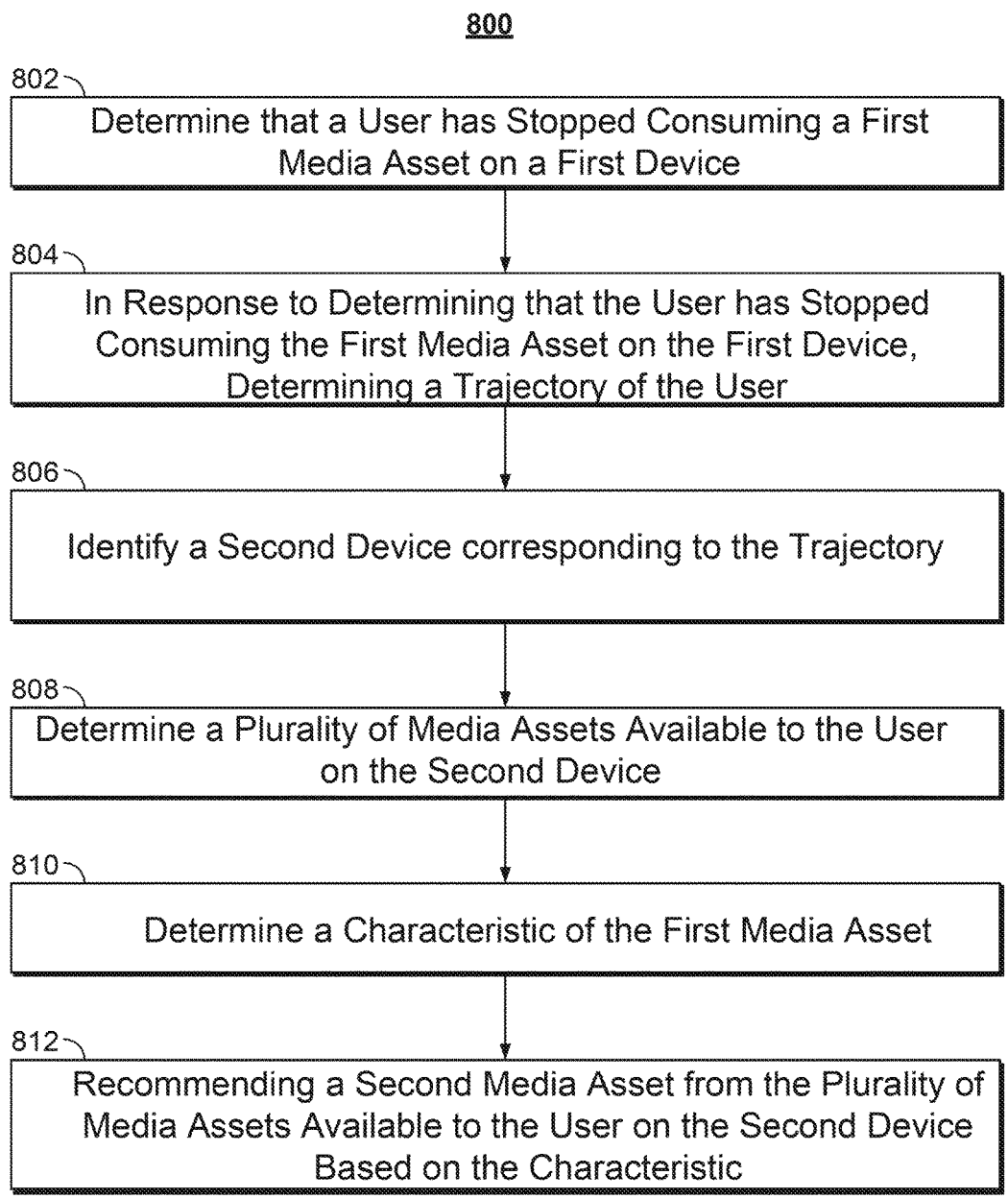
FIG. 8 is a flowchart of illustrative steps involved in selecting a media asset based on a trajectory of a user in accordance with some embodiments of the disclosure.

FIG. 8 is a flowchart of illustrative steps involved in selecting a media asset based on a trajectory of a user. It should be noted that process 800 or any step thereof could be performed on, or provided by, any of the devices shown in FIGS. 3-4. For example, process 800 may be executed by control circuitry 304 (FIG. 3) as instructed by a media guidance application implemented on user equipment 402, 404, and/or 406 (FIG. 4) in order to select a media asset based on a trajectory of a user. In addition, one or more steps of process 800 may be incorporated into or combined with one or more steps of any other process or embodiment (e.g., as described in FIGS. 6-7 and 9-13).

At step 802, the media guidance application implemented on control circuitry (e.g., control circuitry 304 (FIG. 3)) determines that a user has stopped consuming a first media asset on a first device. For example, the media guidance application may determine (e.g., via control circuitry 304 (FIG. 3)) that the user has stopped consuming the first media asset on the first device by detecting that the user has moved from a first location corresponding to first device to the second location. Additionally or alternatively, the media guidance application may determine (e.g., via control circuitry 304 (FIG. 3)) that the user has stopped consuming the first media asset on the first device by detecting that the user has stopped interacting with the first device. For example, the media guidance application may determine that a user has stopped watching a football game on a television at the residence of the user.

At step 804, the media guidance application determines (e.g., via control circuitry 304 (FIG. 3)) a trajectory of the user in response to determining that the user has stopped consuming the first media asset on the first device. For example, the media guidance application may determine (e.g., via control circuitry 304 (FIG. 3)) the trajectory by determining a first location corresponding to the first device, determining a current location of the user, and comparing the first location to the current location. For example, by determining the difference between the current location of the user and the initial location of the user, the media guidance application may determine a direction of the user. For example, the media guidance application may determine that the user is currently travelling to a friend's residence.

At step 806, the media guidance application identifies (e.g., via control circuitry 304 (FIG. 3)) a second device corresponding to the trajectory. For example, the media guidance application may store (e.g., at storage 308 (FIG. 3) and/or any location accessible via communications network 414 (FIG. 4)) a list of devices corresponding to the user and the various locations of those devices. Furthermore, the media guidance application may identify (e.g., via control circuitry 304 (FIG. 3)) what locations, if any, correspond to a current trajectory from the first device. For example, the media guidance application may store a second location corresponding to the second device in memory (e.g., at storage 308 (FIG. 3) and/or any location accessible via communications network 414 (FIG. 4)). The media guidance application may then retrieve (e.g., via control circuitry 304 (FIG. 3)) the second location of the second device from the memory. The media guidance application may then determine that the second location corresponds to the trajectory. For example, the media guidance application may determine that the friend has a television and subscribes to one or more content providers.

At step 808, the media guidance application may determine (e.g., via control circuitry 304 (FIG. 3)) a plurality of media assets available to the user on the second device. For example, while in some cases, the media assets available on the second device may be the same as the media assets available to the user on the first device, in some cases the media assets may differ. Accordingly, before the media guidance application recommends a media asset for presentation on the second device, the media guidance application may first need to determine (e.g., via control circuitry 304 (FIG. 3)) what media assets are available. For example, the media guidance application may determine what programs are available from the content providers that the friend subscribes to.

The media guidance application determines (e.g., via control circuitry 304 (FIG. 3)) a characteristic of the first media asset. For example, the media guidance application may attempt to recommend a media asset for presentation on the second device that is the same or similar to a media asset recently consumed by the user on a first device. For example, the media guidance application may search for a second media asset that shares the same genre, subject matter, title, type, actor, character, and/or location. For example, the media guidance application may identify characteristics corresponding to the plurality of media assets available to the user on the second device and filter the plurality of media assets available to the user on the second device based on a presence of the characteristic. For example, the media guidance application may determine a title of the program that the user was consuming prior to leaving his house.

At step 812, the media guidance application recommends (e.g., via control circuitry 304 (FIG. 3)) a second media asset from the plurality of media assets available to the user on the second device based on the characteristic. For example, upon finding a second media asset that is similar to the first media asset, the media guidance application may generate (e.g., via control circuitry 304 (FIG. 3)) an alert (e.g., as described in FIG. 5) that indicates to the user (e.g., on display 312 (FIG. 3)) that the second media asset is available on the second device. For example, the media guidance application may determine a plurality of content types consumed by the user during a period of time on the first device and determine the characteristic based on a content type of the plurality of content types most frequently consumed by the user. For example, the media guidance application may recommend the same program that the user was consuming at his own house if the same program is available at the friend's house.

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 8.

Figure 9:
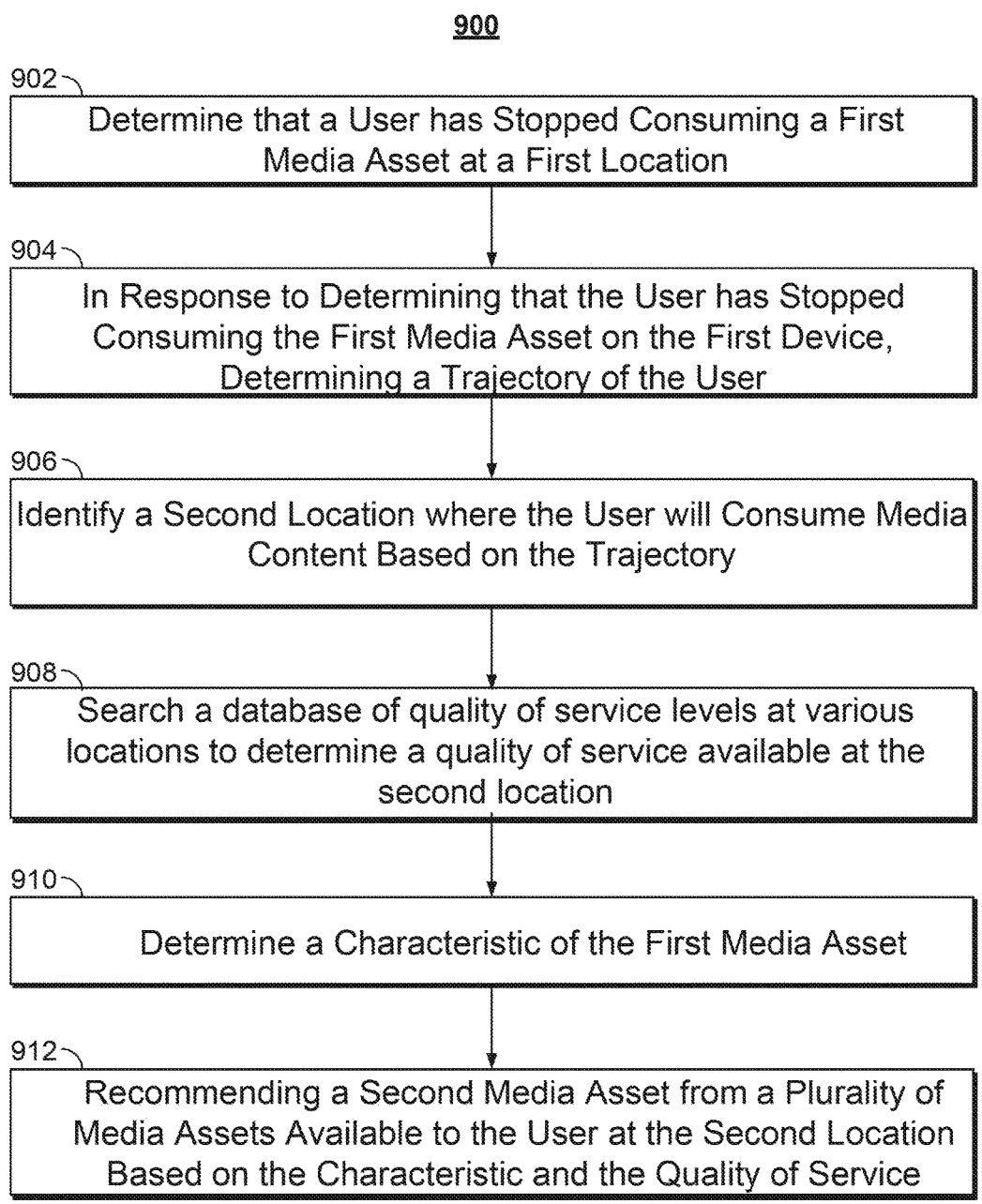
FIG. 9 is a flowchart of illustrative steps involved in selecting a media asset based on a quality of service at a location in accordance with some embodiments of the disclosure.

FIG. 9 is a flowchart of illustrative steps involved in selecting a media asset based on a quality of service at a location. It should be noted that process 800 or any step thereof could be performed on, or provided by, any of the devices shown in FIGS. 3-4. For example, process 900 may be executed by control circuitry 304 (FIG. 3) as instructed by a media guidance application implemented on user equipment 402, 404, and/or 406 (FIG. 4) in order to select a media asset based on a quality of service at a location. In addition, one or more steps of process 900 may be incorporated into or combined with one or more steps of any other process or embodiment (e.g., as described in FIGS. 6-8).

At step 902, the media guidance application implemented on control circuitry (e.g., control circuitry 304 (FIG. 3)) determines that a user has stopped consuming a first media asset at a first location. For example, the media guidance application may determining (e.g., via control circuitry 304 (FIG. 3)) that the user has stopped consuming the first media asset at the first location by detecting that the user has moved a threshold distance from the first location. Alternatively or additionally, the media guidance application may determine (e.g., via control circuitry 304 (FIG. 3)) that the user has stopped consuming the first media asset at the first location comprises detecting that the user has stopped interacting with a device at the first location. For example, the media guidance application determines that a user was consuming a football program.

At step 904, the media guidance application determines (e.g., via control circuitry 304 (FIG. 3)) a trajectory of the user in response to determining that the user has stopped consuming the first media asset at the first location. For example, the media guidance application may determine (e.g., via control circuitry 304 (FIG. 3)) the trajectory by determining a current location of the user and compare the first location to the current location. For example, by determining the difference between the current location of the user and the initial location of the user, the media guidance application may determine (e.g., via control circuitry 304 (FIG. 3)) a direction of the user. For example, the media guidance application may determine that the current trajectory of the user is leading the user into a particular area.

At step 906, the media guidance application identifies (e.g., via control circuitry 304 (FIG. 3)) a second location where the user will consume media content based on the trajectory. For example, the media guidance application may input (e.g., via control circuitry 304 (FIG. 3)) the trajectory into a database (e.g., storage 308 (FIG. 3) and/or any other location accessible via communications network 414 (FIG. 4)) listing locations associated with different trajectories from the first location, search (e.g., via control circuitry 304 (FIG. 3)) the database, and receive an output of the second location in response to searching the database. For example, the media guidance application may determine that the area the user is traveling to has poor Internet network coverage, but has adequate radio coverage.

At step 908, the media guidance application searches (e.g., via control circuitry 304 (FIG. 3)) a database (e.g., storage 308 (FIG. 3) and/or any other location accessible via communications network 414 (FIG. 4)) of quality of service levels at various locations to determine a quality of service available at the second location. For example, different locations may have different quality of service as measured by error rates, bit rates, throughput, transmission delay, availability, and/or jitter. The different quality of service may prevent some content (e.g., a high-definition video program) from being presented in both locations. For example, low quality of service in a location may allow for only low-definition video or audio programs to be presented. For example, the media guidance application may determine that an area the user is currently traveling to has poor Internet network coverage, but has adequate radio coverage.

At step 910, the media guidance application determines (e.g., via control circuitry 304 (FIG. 3)) a characteristic of the first media asset. For example, the media guidance application may attempt to recommend a media asset for presentation at the second location that is the same or similar to a media asset recently consumed by the user at the first location. For example, the media guidance application may search for a second media asset that shares the same genre, subject matter, title, type, actor, character, and/or location. For example, the media guidance application may identify characteristics corresponding to the plurality of media assets available to the user at the second location and filter the plurality of media assets available to the user at the second location based on a presence of the characteristic.

At step 912, the media guidance application recommends (e.g., via control circuitry 304 (FIG. 3)) a second media asset from a plurality of media assets available to the user at the second location based on the characteristic and the quality of service (e.g., as shown in FIG. 5). For example, the media guidance application may determine (e.g., via control circuitry 304 (FIG. 3)) a plurality of content types consumed by the user during a period of time at the first location and determine the characteristic based on a content type of the plurality of content types most frequently consumed by the user. Moreover, the media guidance application may identify (e.g., via control circuitry 304 (FIG. 3)) required quality of service levels corresponding to the plurality of media assets available to the user at the second location and filter the plurality of media assets available to the user at the second location based on whether or not the second location has the required quality of service. For example, as the area has poor Internet network coverage, but has adequate radio coverage, the media guidance application may recommend a radio broadcast of subject matter similar to the subject matter that the user was consuming at the first location.

It is contemplated that the steps or descriptions of FIG. 9 may be used with any other embodiment of this disclosure. In addition, the steps and descriptions described in relation to FIG. 9 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 9.

Figure 10:
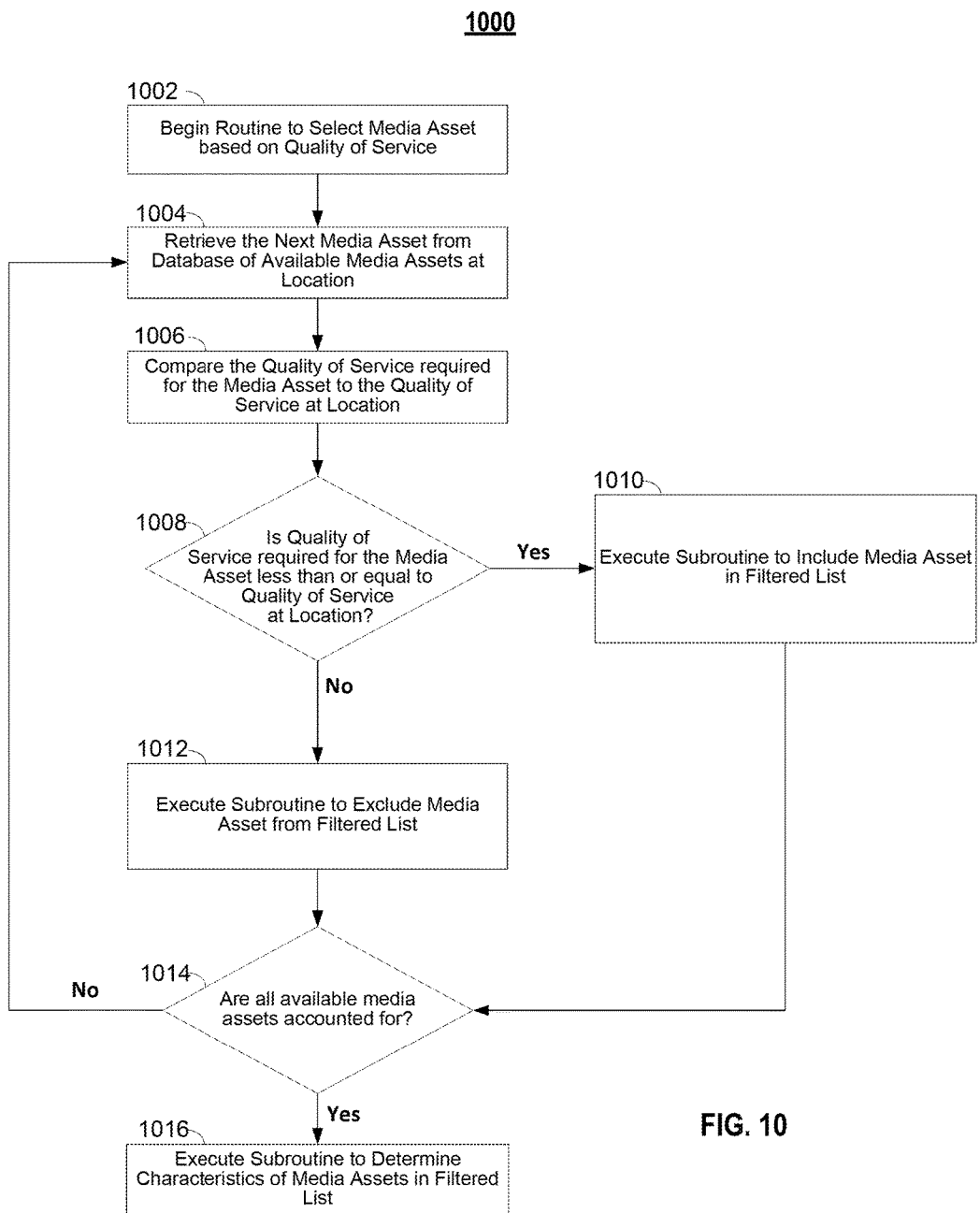
FIG. 10 is a flowchart of illustrative steps involved in selecting a media asset based on quality of service in accordance with some embodiments of the disclosure.

FIGS. 10 and 11 present processes for control circuitry (e.g., control circuitry 304) to select media asset based on quality of service in accordance with some embodiments of the disclosure. In some embodiments this process may be encoded on to non-transitory storage medium (e.g., storage device 308) as a set of instructions to be decoded and executed by processing circuitry (e.g., processing circuitry 306). Processing circuitry may in turn provide instructions to other sub-circuits contained within control circuitry 304, such as the tuning, video generating, encoding, decoding, encrypting, decrypting, scaling, analog/digital conversion circuitry, and the like.

At step 1002, the media guidance application (e.g., via control circuitry 304 (FIG. 3)) begins a routine to select a media asset based on a quality of service in an area. In some embodiments, this may be done either directly or indirectly in response to a user action or input (e.g., from signals received by control circuitry 304 or user input interface 310). For example, the process may begin directly in response to control circuitry 304 receiving signals from user input interface 310, or control circuitry 304 may prompt the user to confirm their input using a display (e.g., by generating a prompt to be displayed on display 312) prior to running the algorithm.

At step 1004, the media guidance application (e.g., via control circuitry 304 (FIG. 3)) proceeds to retrieve the next media asset from the database of available media assets at the location. In some embodiments control circuitry 304 may receive a single primitive data structure that represents the media asset. In some embodiments the value may be stored as part of a larger data structure, and control circuitry 304 may retrieve the value by executing appropriate accessor methods to retrieve the value from the larger data structure.

At step 1006, control circuitry 304 proceeds to compare the quality of service required for the media asset to the quality of service at the location. In some embodiments, the value of the quality of service at the location may be retrieved from a storage device (e.g., storage 308 (FIG. 3) and/or a location accessible via communications network 414 (FIG. 4)). In some embodiments, control circuitry 304 may directly compare the quality of service required for the media asset to the quality of service at the location by accessing the values respectively from memory and performing a value comparison. In some instances, control circuitry 304 may call a comparison function (e.g., for object to object comparison) to compare quality of service required for the media asset to the quality of service at the location.

At step 1008, the media guidance application (e.g., via control circuitry 304 (FIG. 3)) compares the values of the quality of service required for the media asset to the quality of service at the location to determine if the value of the quality of service required for the media asset is less than or equal to the quality of service at the location. If the condition is satisfied, process 1000 proceeds to step 1010; if the condition is not satisfied, process 1000 proceeds to step 1012 instead.

At step 1010, the media guidance application (e.g., via control circuitry 304 (FIG. 3)) executes a subroutine to include the media asset in the filtered list based on the condition at step 1008 being satisfied. After the subroutine is executed, process 1000 proceeds to step 1014 where it is determined if all media assets available at the location are accounted for and further iterations are needed.

At step 1012, the media guidance application (e.g., via control circuitry 304 (FIG. 3)) executes a subroutine to exclude media asset from filtered list based on the condition of step 512 being satisfied. After the subroutine is executed, process 1000 proceeds to step 1014 where it is determined if all media assets are accounted for and if further iterations are needed.

At step 1016, the media guidance application (e.g., via control circuitry 304 (FIG. 3)) executes a subroutine to determine characteristics of media assets in the filtered list.

It is contemplated that the descriptions of FIG. 10 may be used with any other embodiment of this disclosure. In addition, the descriptions described in relation to the algorithm of FIG. 10 may be done in alternative orders or in parallel to further the purposes of this disclosure. For example, conditional statements and logical evaluations, such as those at 1008 may be performed in any order or in parallel or simultaneously to reduce lag or increase the speed of the system or method. As a further example, in some embodiments several media assets may be evaluated in parallel, using multiple logical processor threads, or the algorithm may be enhanced by incorporating branch prediction. Furthermore, it should be noted that the process of FIG. 10 may be implemented on a combination of appropriately configured software and hardware, and that any of the devices or equipment discussed in relation to FIGS. 3-4 could be used to implement one or more portions of the process.

The pseudocode in FIG. 11 describes a process to select a media asset based on a quality of service at a location in accordance with some embodiments of the disclosure. It will be evident to one skilled in the art that the process described by the pseudocode in FIG. 11 may be implemented in any number of programming languages and a variety of different hardware, and that the style and format should not be construed as limiting, but rather a general template of the steps and procedures that would be consistent with code used to implement some embodiments of this disclosure.

At line 1101, the media guidance application (e.g., via control circuitry 304 (FIG. 3)) runs a subroutine to initialize variables and prepare to select media assets based on the quality of service at a location, which begins on line 1105. For example, in some embodiments control circuitry 304 may copy instructions from non-transitory storage medium (e.g., storage device 308) into RAM or into the cache for processing circuitry 306 during the initialization stage. Additionally, in some embodiments the value of a required quality of service for a media asset at a location being used for comparison, or a tolerance level for determining if two values are essentially equivalent, may be retrieved, set, and stored at 1101.

At line 1105, media guidance application (e.g., via control circuitry 304 (FIG. 3)) receives a media assets available at the location. In some embodiments these instances may be retrieved from storage 308 (FIG. 3) and/or any location accessible via communications network 414 (FIG. 4)). Control circuitry 304 may receive the media asset by receiving, for example, a pointer to an array of values of available media assets at the location. In another example, control circuitry 304 may receive an object of a class, such as an iterator object containing elements of the media asset.

At line 1106, control circuitry 304 iterates through the various media assets available at the location, if only a single instance is available, the loop will only execute once. This loop may be implemented in multiple fashions depending on the choice of hardware and software language used to implement the algorithm of FIG. 11; for example, this may be implemented as part of a "for" or "while" loop.

At line 1107, control circuitry 304 stores the value of the required quality of service into a temporary variable "A." In some embodiments the value of the required quality of service will be stored as part of a larger data structure or class, and the value of required quality of service may be obtained through appropriate accessor methods. In some embodiments, required quality of service may be converted from a string or other non-numeric data type into a numeric data type by means of an appropriate hashing algorithm. In some embodiments, control circuitry 304 may call a function to perform a comparison of the required quality of service of the media asset and the quality of service at the location. In some embodiments required quality of service of the media asset may be encoded as a primitive data structure, and rather than using a temporary variable, required quality of service of the media asset may be directly used in the comparisons at lines 1109 and 1111.

At line 1108, control circuitry 304 stores the value of the quality of service at the location into a temporary variable "B." Similar to the required quality of service of the media asset, in some embodiments the value of quality of service at the location will be stored as part of a larger data structure or class, and the value of the quality of service at the location may be obtained through accessor methods. In some embodiments the quality of service at the location may be converted from a string or other non-numeric data type into a numeric data type by means of an appropriate hashing algorithm, or the quality of service at the location may be a primitive data structure, and may be directly used in the comparisons at lines 1109 and 1111.

At line 1109, the media guidance application (e.g., via control circuitry 304 (FIG. 3)) compares the value of A to the value of B to see if they are essentially equivalent. This is achieved by subtracting the value of A from B, taking the absolute value of the difference, and then comparing the absolute value of the difference to a predetermined tolerance level. In some embodiments the tolerance level may be a set percentage of either A or B. In some embodiments the tolerance level may be a fixed number. For example, setting the tolerance level to a set multiple of machine epsilon may allow for the algorithm to account for small rounding errors that may result from the use of floating point arithmetic. In some embodiments the tolerance level may be set to zero, or the condition inside the IF statement may be replaced with a strict equivalence between A and B.

At line 1110, the media guidance application (e.g., via control circuitry 304 (FIG. 3)) executes a subroutine to include a media asset in the filtered if the condition in line 1109 is satisfied. In some embodiments this may be achieved by processing circuitry 306 (FIG. 3) sending the appropriate signals to control circuitry 304 (FIG. 3).

At line 1111, the media guidance application (e.g., via control circuitry 304 (FIG. 3)) compares the value of A and B to determine if B is less than A. In some embodiments this comparison will only be done if A is not essentially equivalent to B and the comparison in line 1109 evaluates to FALSE.

At line 1112, the media guidance application (e.g., via control circuitry 304 (FIG. 3)) executes a subroutine to exclude media asset in filtered list if the condition in line 1111 is satisfied.

At line 1114, the media guidance application (e.g., via control circuitry 304 (FIG. 3)) runs a termination subroutine after the algorithm has performed its function. For example, in some embodiments control circuitry 304 may destruct variables, perform garbage collection, free memory or clear the cache of processing circuitry 306.

It will be evident to one skilled in the art that process 1100 described by the pseudocode in FIG. 11 may be implemented in any number of programming languages and a variety of different hardware, and the particular choice and location of primitive functions, logical evaluations, and function evaluations are not intended to be limiting. It will also be evident that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs. For example, in some embodiments break conditions may be placed after lines 1110 and 1112 to speed operation, or the conditional statements may be replaced with a case-switch. In some embodiments, rather than iterating over all media assets, in some embodiments the code may be rewritten so control circuitry 304 is instructed to evaluate multiple media assets simultaneously on a plurality of processors or processor threads, lowering the number of iterations needed and potentially speeding up computation time.

Figure 12:
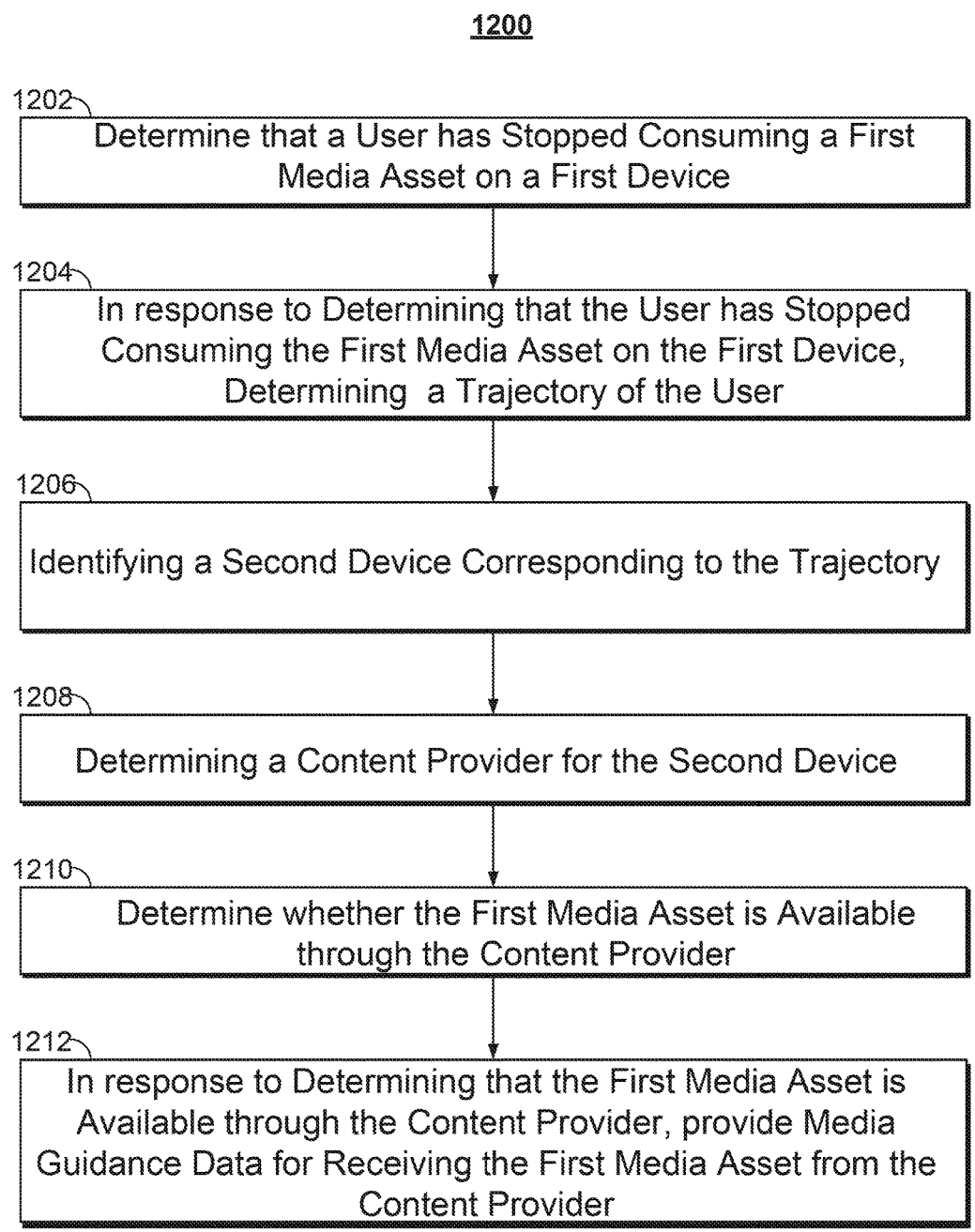
FIG. 12 is a flowchart of illustrative steps involved in identifying content providers at a device selected based on the trajectory of a user in accordance with some embodiments of the disclosure.

FIG. 12 is a flowchart of illustrative steps involved in identifying content providers at a device selected based on the trajectory of a user. It should be noted that process 1200 or any step thereof could be performed on, or provided by, any of the devices shown in FIGS. 3-4. For example, process 1200 may be executed by control circuitry 304 (FIG. 3) as instructed by a media guidance application implemented on user equipment 402, 404, and/or 406 (FIG. 4) in order to identify content providers at a device selected based on the trajectory of a user. In addition, one or more steps of process 1200 may be incorporated into or combined with one or more steps of any other process or embodiment (e.g., as described in FIGS. 7-11 and 13).

At step 1202, the media guidance application determines (e.g., via control circuitry 304 (FIG. 3)) that a user has stopped consuming a first media asset (e.g., a video) on a first device (e.g., device 130 (FIG. 1)). For example, the media guidance application may determine (e.g., via control circuitry 304 (FIG. 3)) that the user has stopped consuming the first media asset on the first device by detecting (e.g., via detection module 316 (FIG. 3)) that the user has moved from a first location corresponding to first device to a second location (e.g., the user has left the viewing area of the first device). In another example, the media guidance application may determine that the user has stopped consuming the first media asset on the first device by detecting (e.g., via detection module 316 (FIG. 3)) that the user has stopped interacting with the first device (e.g., the user has not used the first device for a threshold period of time).

For example, as described above, the media guidance application may recommend media assets based on a media asset that a user was previously consuming. For example, the media guidance application may determine characteristics (e.g., a genre, actor, etc.) of the media asset as recommend other media assets with similar characteristics.

At step 1204, the media guidance application determines (e.g., via control circuitry 304 (FIG. 3)) a trajectory of the user in response to determining that the user has stopped consuming the first media asset on the first device. For example, the media guidance application may determine (e.g., via control circuitry 304 (FIG. 3)) a first location corresponding to the first device, determine a current location of the user, and compare the first location to the current location to determine the trajectory.

At step 1206, the media guidance application identifies (e.g., via control circuitry 304 (FIG. 3)) a second device (e.g., device 132 (FIG. 1)) corresponding to the trajectory. For example, the media guidance application may store (e.g., at storage circuitry 308 (FIG. 3) and/or any location accessible via communications network 414 (FIG. 4)) a second location corresponding to the second device in memory, retrieve the second location of the second device from the memory, and determine (e.g., via control circuitry 304 (FIG. 3)) that the second location corresponds to the trajectory. Additionally or alternatively, the media guidance application may recommend (e.g., via control circuitry 304 (FIG. 3)) the second device based on a quality of service level for the second device being higher than a quality of service level for a third device.

At step 1208, the media guidance application determines (e.g., via control circuitry 304 (FIG. 3)) a content provider for the second device. For example, the media guidance application may determine (e.g., via control circuitry 304 (FIG. 3)) the content provider (e.g., a cable provider, a subscription service subscribed to, etc.) for the second device by searching a database listing content providers for various devices. In another example, the media guidance application may determine the content provider for the second device by querying the second device.

At step 1210, the media guidance application determines (e.g., via control circuitry 304 (FIG. 3)) whether the first media asset is available through the content provider. For example, the media guidance application may determine (e.g., via control circuitry 304 (FIG. 3)) whether the first media asset is available through the content provider by searching all media guidance data available for the content provider for the first media asset.

At step 1212, the media guidance application may provide, using the control circuitry, media guidance data (e.g., a channel number, navigation commands, etc.) for receiving the first media asset from the content provider in response to determining (e.g., via control circuitry 304 (FIG. 3)) that the first media asset is available through the content provider. Additionally or alternatively, in response to determining that the first media asset is not available through the content provider, the media guidance application may identify (e.g., via control circuitry 304 (FIG. 3)) a plurality of media assets available to the user at the second device, filter the plurality of media assets available to the user at the second device based on a comparison of the first media asset and the plurality of media assets available to the user at the second device, and recommend (e.g., via control circuitry 304 (FIG. 3)) a second media asset from the plurality of media assets available to the user on the second device based on the comparison.

It is contemplated that the descriptions of FIG. 12 may be used with any other embodiment of this disclosure. In addition, the descriptions described in relation to the process of FIG. 12 may be done in alternative orders or in parallel to further the purposes of this disclosure. As a further example, in some embodiments several media assets may be evaluated in parallel, using multiple logical processor threads, or the algorithm may be enhanced by incorporating branch prediction. Furthermore, it should be noted that the process of FIG. 12 may be implemented on a combination of appropriately configured software and hardware, and that any of the devices or equipment discussed in relation to FIGS. 3-4 could be used to implement one or more portions of the process.

Figure 13:
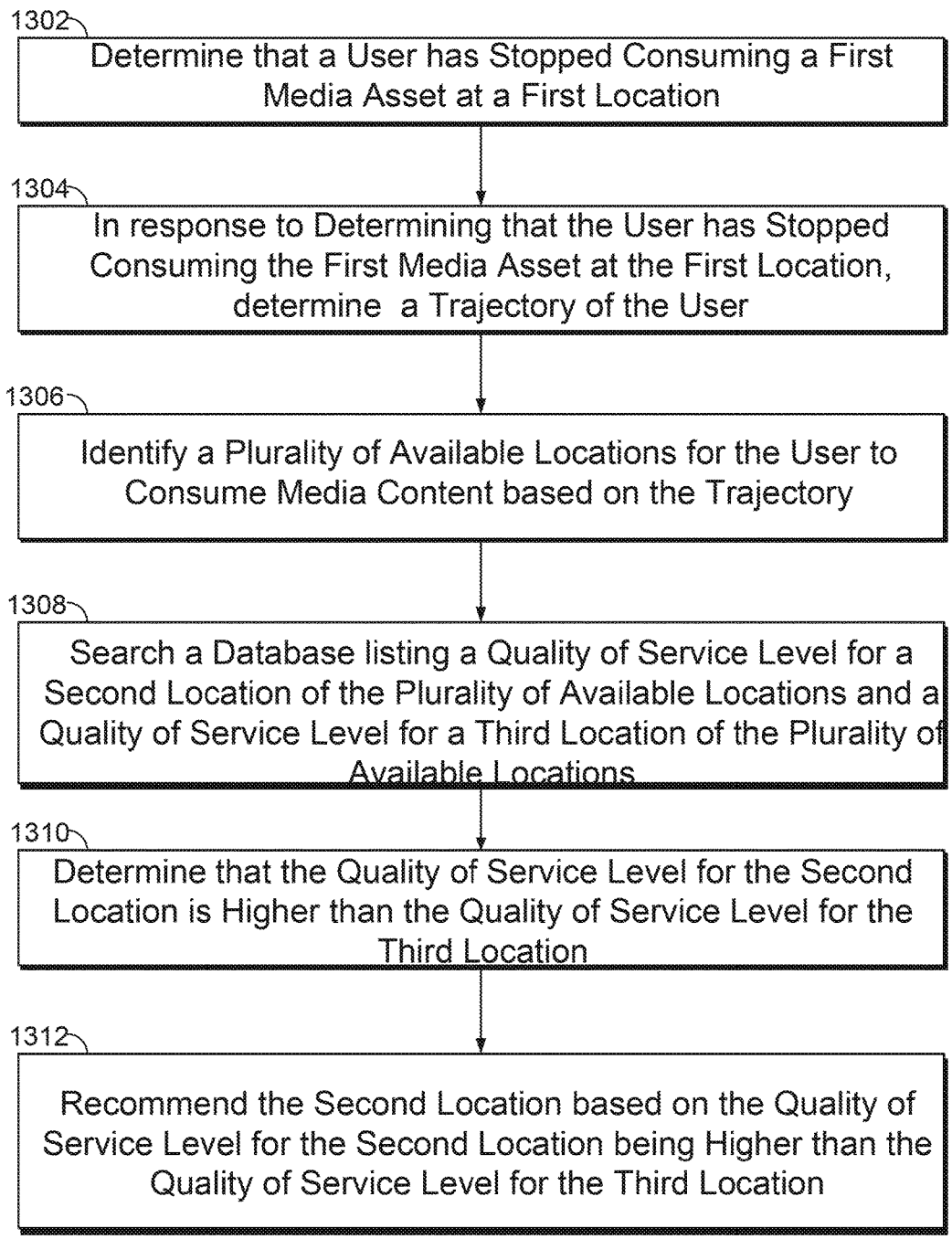
FIG. 13 is a flowchart of illustrative steps involved in recommending a location based on the quality of service level for that location in accordance with some embodiments of the disclosure.

FIG. 13 is a flowchart of illustrative steps involved in recommending a location based on the quality of service level for that location. It should be noted that process 1300 or any step thereof could be performed on, or provided by, any of the devices shown in FIGS. 3-4. For example, process 1300 may be executed by control circuitry 304 (FIG. 3) as instructed by a media guidance application implemented on user equipment 402, 404, and/or 406 (FIG. 4) in order to recommend a location based on the quality of service level for that location. In addition, one or more steps of process 1300 may be incorporated into or combined with one or more steps of any other process or embodiment (e.g., as described in FIGS. 7-12).

At step 1302, the media guidance application may determine (e.g., via control circuitry 304 (FIG. 3) that a user has stopped consuming a first media asset at a first location (e.g., a location associated with device 130 (FIG. 1)). For example, the media guidance application may determine (e.g., via control circuitry 304 (FIG. 3)) that the user has stopped consuming the first media asset at the first location by detecting that the user has moved a threshold distance from the first location. In another example, the media guidance application may determine (e.g., via control circuitry 304 (FIG. 3)) that the user has stopped consuming the first media asset at the first location by detecting that the user has stopped interacting with a device at the first location (e.g., the user may have stopped using device 130 (FIG. 1) for a threshold amount of time).

At step 1304, the media guidance application determines (e.g., via control circuitry 304 (FIG. 3)) a trajectory of the user in response to determining that the user has stopped consuming the first media asset at the first location. For example, the media guidance application may determine (e.g., via control circuitry 304 (FIG. 3)) the trajectory by determining a current location of the user, and compare (e.g., via control circuitry 304 (FIG. 3)) the first location to the current location.

At step 1306, the media guidance application may identify (e.g., via control circuitry 304 (FIG. 3)) a plurality of available locations (e.g., which may each correspond to a different device) for the user to consume media content based on the trajectory. For example, the media guidance application may identify (e.g., via control circuitry 304 (FIG. 3)) the second location of the plurality of available locations where the user will consume media content based on the trajectory, by inputting the trajectory into a database listing locations associated with different trajectories from the first location, searching the database (e.g., at storage circuitry 308 (FIG. 3) and/or any location accessible via communications network 414 (FIG. 4)), and receiving an output of the second location in response to searching the database.

At step 1308, the media guidance application searches (e.g., via control circuitry 304 (FIG. 3)) a database (e.g., located at storage circuitry 308 (FIG. 3) and/or any location accessible via communications network 414 (FIG. 4)) listing a quality of service level for a second location of the plurality of available locations and a quality of service level for a third location of the plurality of available locations. For example, the first location may correspond to a first viewing area for a first device (e.g., device 130 (FIG. 1)) and the second location may correspond to a second viewing area for a second device (e.g., device 132 (FIG. 1)).

At step 1310, the media guidance application determines (e.g., via control circuitry 304 (FIG. 3)) that the quality of service level for the second location (e.g., the location associated with device 220 (FIG. 2)) is higher than the quality of service level for the third location (e.g., the location associated with device 222 (FIG. 2)). For example, the quality of service quality may be measured based on an error rate, bit rate, throughput, transmission delay, availability, or jitter.

At step 1312, the media guidance application recommends (e.g., via control circuitry 304 (FIG. 3)) the second location based on the quality of service level for the second location being higher than the quality of service level for the third location. For example, the media guidance application may recommend (e.g., via control circuitry 304 (FIG. 3)) a location that provides the best viewing experience for a user.

In some embodiments, the media guidance application may identify (e.g., via control circuitry 304 (FIG. 3)) a plurality of media assets available to the user at the second location. The media guidance application may filter (e.g., via control circuitry 304 (FIG. 3)) the plurality of media assets available to the user at the second location based on a comparison of the first media asset and the plurality of media assets available to the user at the second location. The media guidance application may then recommend (e.g., via control circuitry 304 (FIG. 3)) a second media asset from the plurality of media assets available to the user on the second device based on the comparison. The media guidance application may also provide (e.g., via control circuitry 304 (FIG. 3)) media guidance data for receiving the second media asset at the second location.

It is contemplated that the descriptions of FIG. 13 may be used with any other embodiment of this disclosure. In addition, the descriptions described in relation to the process of FIG. 13 may be done in alternative orders or in parallel to further the purposes of this disclosure. As a further example, in some embodiments several media assets may be evaluated in parallel, using multiple logical processor threads, or the algorithm may be enhanced by incorporating branch prediction. Furthermore, it should be noted that the process of FIG. 13 may be implemented on a combination of appropriately configured software and hardware, and that any of the devices or equipment discussed in relation to FIGS. 3-4 could be used to implement one or more portions of the process.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for providing recommendations based on user trajectories, the method comprising:
   determining, using control circuitry, that a threshold period of time has elapsed since an input of a user was last received at a first device outputting a first media asset;
   in response to determining that the threshold period of time has elapsed since the input of the user was last received at the first device outputting the first media asset, determining, using the control circuitry, a trajectory of the user, wherein the trajectory of the user comprises a direction of movement of the user;
   in response to a database request that includes the trajectory, receiving a plurality of available locations on the trajectory;
   determining, using the control circuitry, a second location and a third location on the trajectory from both (1) the plurality of available locations on the trajectory and (2) the first location;
   searching, using the control circuitry, a database listing a quality of service level for the second location of the plurality of available locations and a quality of service level for the third location of the plurality of available locations;
   determining that the quality of service level for the second location is higher than the quality of service level for the third location; and
   recommending, using the control circuitry, the second location based on the quality of service level for the second location being higher than the quality of service level for the third location.

2. The method of claim 1, further comprising determining that the user has stopped consuming the first media asset at the first location by detecting that the user has moved a threshold distance from the first location.

3. The method of claim 1, wherein the first location corresponds to a first viewing area for the first device and the second location corresponds to a second viewing area for a second device.

4. The method of claim 1, wherein determining the trajectory of the user, further comprises:
   determining a current location of the user; and
   comparing the first location to the current location.

5. The method of claim 1, wherein each of the plurality of available locations corresponds to a different device.

6. The method of claim 1, further comprising:
   identifying a plurality of media assets available to the user at the second location; and
   filtering the plurality of media assets available to the user at the second location based on a comparison of the first media asset and the plurality of media assets available to the user at the second location; and
   recommending a second media asset from the plurality of media assets available to the user on the second device based on the comparison.

7. The method of claim 6, further comprising providing media guidance data for receiving the second media asset at the second location.

8. The method of claim 1, wherein the quality of service for the second location is measured based on an error rate, bit rate, throughput, transmission delay, availability, or jitter.

9. A system for providing recommendations based on user trajectories, the system comprising:
   storage circuitry configured to store a database listing a quality of service level for a second location and a quality of service level for a third location; and
   control circuitry configured to:
      determine that a threshold period of time has elapsed since an input of a user was last received at a first device outputting a first media asset;
      in response to determining that the threshold period of time has elapsed since the input of the user was last received at the first device outputting the first media asset, determine a trajectory of the user, wherein the trajectory of the user comprises a direction of a movement of the user;
      in response to a database request that includes the trajectory, receiving a plurality of available locations on the trajectory;
      determine the second location and the third location on the trajectory from both (1) the plurality of available locations on the trajectory and (2) the first location;
      search the database listing the quality of service level for the second location of the plurality of available locations and the quality of service level for the third location of the plurality of available locations;
      determine that the quality of service level for the second location is higher than the quality of service level for the third location; and
      recommend the second location based on the quality of service level for the second location being higher than the quality of service level for the third location.

10. The system of claim 9, wherein the control circuitry is further configured to determine that the user has stopped consuming the first media asset at the first location by detecting that the user has moved a threshold distance from the first location.

11. The system of claim 9, wherein the first location corresponds to a first viewing area for the first device and the second location corresponds to a second viewing area for a second device.

12. The system of claim 9, wherein the control circuitry configured to determine the trajectory of the user, further configured to:
   determine a current location of the user; and
   compare the first location to the current location.

13. The system of claim 9, wherein each of the plurality of available locations corresponds to a different device.

14. The system of claim 9, wherein the control circuitry configured to:
   identify a plurality of media assets available to the user at the second location; and
   filter the plurality of media assets available to the user at the second location based on a comparison of the first media asset and the plurality of media assets available to the user at the second location; and
   recommend a second media asset from the plurality of media assets available to the user on the second device based on the comparison.

15. The system of claim 14, wherein the control circuitry configured to provide media guidance data for receiving the second media asset at the second location.

16. The system of claim 9, wherein the quality of service for the second location is measured based on an error rate, bit rate, throughput, transmission delay, availability, or jitter.

17. A method for recommending a place to view media based on user movement, the method comprising:
- determining that a threshold period of time has elapsed since an input of a user was last received at a device playing a media asset at a first location;
- in response to determining that the threshold period of time has elapsed, determining a direction of movement of the user;
- identifying a plurality of locations that are located along the direction of movement;
- retrieving, from a database associating quality of service (QoS) levels with locations, a QoS level for each respective location in the plurality of locations;
- determining a highest QoS level from the retrieved QoS levels;
- identifying the location associated with the highest QoS level; and
- generating, for display, a recommendation of the location.

18. The method of claim 17, wherein determining the direction of movement of the user, further comprises:
- determining a current location of the user; and
- determining a difference between the current location and the first location.

19. The method of claim 17, wherein identifying the plurality of locations that are located along the direction of movement, further comprises:
- searching for the direction of movement in a second database associating different directions from the first location with destination locations;
- identifying, based on the searching, entries of the destination locations associated with the direction of movement in the second database; and
- retrieving the plurality of locations from the second database, wherein the plurality of locations comprises the entries.

* * * * *